US009945677B1

(12) United States Patent
Watts

(10) Patent No.: US 9,945,677 B1
(45) Date of Patent: Apr. 17, 2018

(54) AUTOMATED LANE AND ROUTE NETWORK DISCOVERY FOR ROBOTIC ACTORS

(71) Applicant: X Development LLC, Mountain View, CA (US)

(72) Inventor: Kevin William Watts, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 123 days.

(21) Appl. No.: 14/807,797

(22) Filed: Jul. 23, 2015

(51) Int. Cl.
| G05D 1/00 | (2006.01) |
| G01C 21/00 | (2006.01) |
| G01C 21/34 | (2006.01) |
| G05D 1/02 | (2006.01) |
| B25J 9/16 | (2006.01) |

(52) U.S. Cl.
CPC ........... G01C 21/34 (2013.01); G05D 1/0276 (2013.01); B25J 9/1664 (2013.01); Y10S 901/01 (2013.01)

(58) Field of Classification Search
None
See application file for complete search history.

(56) References Cited

U.S. PATENT DOCUMENTS

| 6,539,284 | B2 | 3/2003 | Nourbakhsh et al. | |
| 6,941,191 | B2 | 9/2005 | Jaeger | |
| 8,774,981 | B2 | 7/2014 | Paz-Meidan et al. | |
| 8,924,016 | B2 * | 12/2014 | Kim | B25J 9/162 |
| | | | | 700/255 |
| 9,188,982 | B2 * | 11/2015 | Thomson | G05D 1/0274 |
| 9,573,273 | B2 * | 2/2017 | Takeda | B25J 9/1605 |
| 9,592,609 | B2 * | 3/2017 | LaFary | G06N 3/008 |
| 2005/0216182 | A1 * | 9/2005 | Hussain | G01C 21/20 |
| | | | | 701/532 |

(Continued)

OTHER PUBLICATIONS

P. Duan et al., "Mobile Robot Navigation based on Human Walking Trajectory in Intelligent Space", International Journal of Control and Automation, Nov., 2014, pp. 235-244, vol. 7, No. 11, Science and Engineering Research Support Society.

(Continued)

*Primary Examiner* — Thomas G Black
*Assistant Examiner* — Demetra R Smith-Stewart
(74) *Attorney, Agent, or Firm* — McDonnell Boehnen Hulbert & Berghoff LLP

(57) ABSTRACT

Systems and methods are provided for automated route discovery. A computing device can receive location data for designated actor(s) of a plurality of actors operating within an environment. The plurality of actors can also include a robotic device. The computing device can determine a route network of paths taken by the designated actor(s) within the environment, where the route network includes information about frequencies of paths taken by the designated actor(s) based on the location data. The computing device can receive a starting location and a destination location for the robotic device. The computing device can select a selected path from the starting location to the destination location based on the route network taken by the designated actor(s). The computing device can provide an instruction to the robotic device to use the selected path to travel from the starting location to the destination location.

20 Claims, 18 Drawing Sheets

(56) References Cited

U.S. PATENT DOCUMENTS

| | | | |
|---|---|---|---|
| 2014/0032035 A1* | 1/2014 | Thomson | G05D 1/0274 701/25 |
| 2014/0365258 A1* | 12/2014 | Vestal | G06Q 10/063114 705/7.15 |
| 2015/0239121 A1* | 8/2015 | Takeda | B25J 9/1605 700/250 |
| 2016/0031083 A1* | 2/2016 | Embon | B25J 9/1676 700/255 |
| 2017/0329347 A1* | 11/2017 | Passot | G05D 1/0274 |

OTHER PUBLICATIONS

P. Sanders et al, "Engineering Fast Route Planning Algorithms", Jun. 6, 2007, Proceedings of the 6th Workshop Experimental Algorithms (WEA '07), pp. 23-36, Springer-Verlag, Berlin, Germany.

T. Sasaki et al., "Intelligent Space as a Platform for Human Observation", Sep. 2007, Human Robot Interaction, pp. 309-323, Chapter 17, Itech Education and Publishing, Vienna, Austria.

* cited by examiner

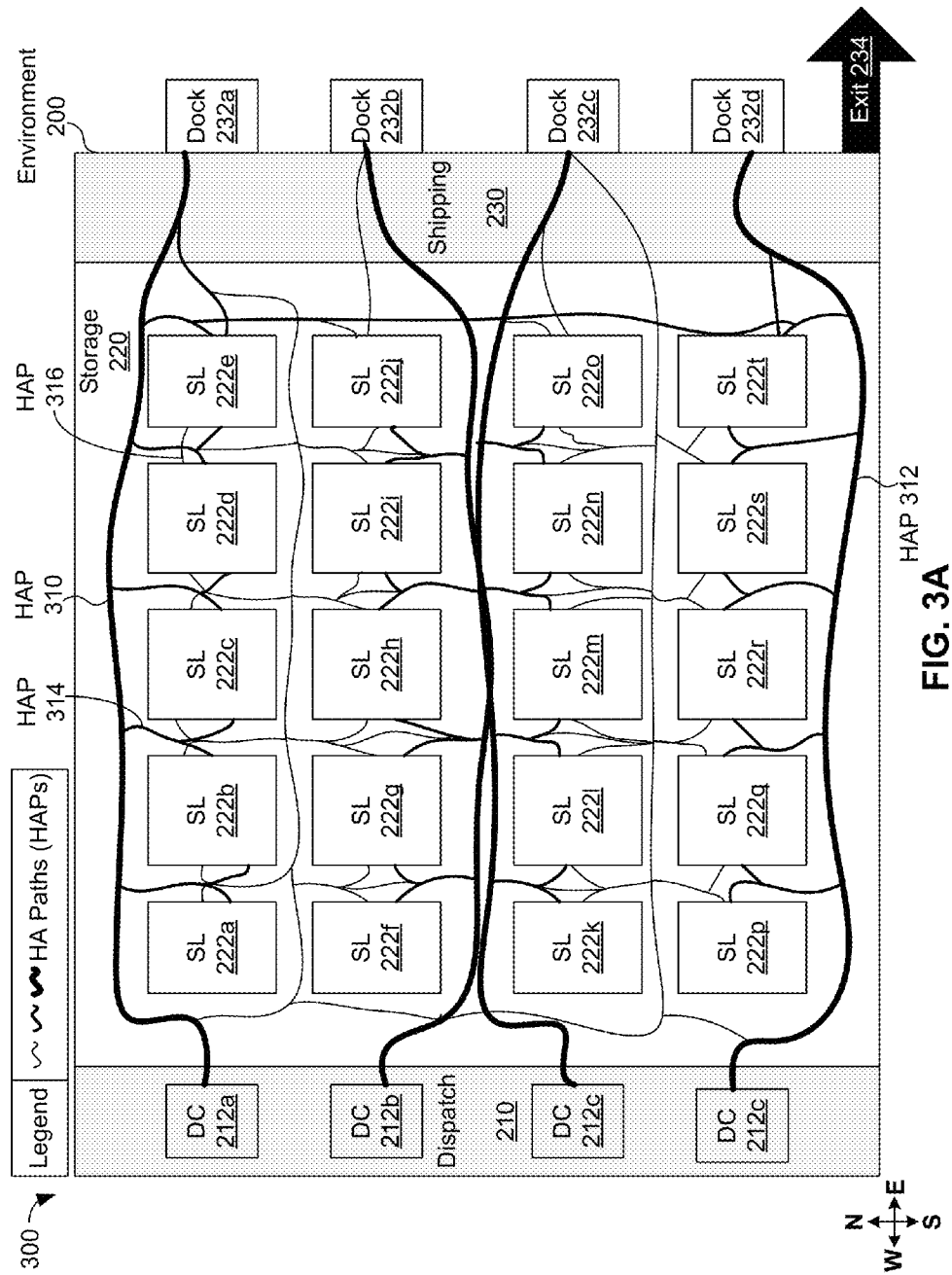

AUTOMATED LANE AND ROUTE NETWORK DISCOVERY FOR ROBOTIC ACTORS

BACKGROUND

One or more robots and/or other actors, such as human actors, can move throughout a space, such as the interior of part or all of a building and/or its surrounding outdoor regions, to perform tasks and/or otherwise utilize the space. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

In one aspect, a method is provided. A computing device receives location data for one or more designated actors of a plurality of actors operating within an environment. The plurality of actors further include a robotic device. The computing device determines a route network of paths taken by the one or more designated actors within the environment. The route network of paths includes information about frequencies of paths taken by the one or more designated actors based on the location data for the one or more designated actors. The computing device receives a starting location and a destination location for the robotic device. The computing device selects a selected path from the starting location to the destination location based on the route network of paths taken by the one or more designated actors. The computing device provides an instruction to the robotic device to use the selected path to travel from the starting location to the destination location.

In another aspect, a computing device is provided. The computing device has one or more processors and data storage. The data storage includes at least computer-executable instructions stored thereon that, when executed by the one or more processors, cause the computing device to perform functions. The functions include: receiving location data for one or more designated actors of a plurality of actors operating within an environment, where the plurality of actors further include a robotic device; determining a route network of paths taken by the one or more designated actors within the environment based on the location data for the one or more designated actors, where the route network of paths comprises information about frequencies of paths taken by the one or more designated actors based on the location data for the one or more designated actors; receiving a starting location and a destination location for the robotic device; selecting a selected path from the starting location to the destination location based on the route network of paths taken by the one or more designated actors; and providing an instruction to the robotic device to use the selected path to travel from the starting location to the destination location.

In another aspect, a non-transitory computer readable medium is provided. The non-transitory computer readable medium has stored thereon instructions, that when executed by one or more processors of a computing device, cause the computing device to perform functions. The functions include: receiving location data for one or more designated actors of a plurality of actors operating within an environment, where the plurality of actors further include a robotic device; determining a route network of paths taken by the one or more designated actors within the environment, where the route network of paths includes information about frequencies of paths taken by the one or more designated actors based on the location data for the one or more designated actors; receiving a starting location and a destination location for the robotic device; selecting a selected path from the starting location to the destination location based on the route network of paths taken by the one or more designated actors; and providing an instruction to the robotic device to use the selected path to travel from the starting location to the destination location.

In another aspect, an apparatus is provided. The apparatus includes: means for receiving location data for one or more designated actors of a plurality of actors operating within an environment, where the plurality of actors further include a robotic device; means for determining a route network of paths taken by the one or more designated actors within the environment, where the route network of paths includes information about frequencies of paths taken by the one or more designated actors based on the location data for the one or more designated actors; means for receiving a starting location and a destination location for the robotic device; means for selecting a selected path from the starting location to the destination location based on the route network of paths taken by the one or more designated actors; and means for providing an instruction to the robotic device to use the selected path to travel from the starting location to the destination location.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIGS. 3A-3F show a scenario with actors generating path networks in the warehouse environment of FIG. 2A based on paths from various groups of designated actors, in accordance with an example embodiment.

DETAILED DESCRIPTION

Overview

Figure 1A:
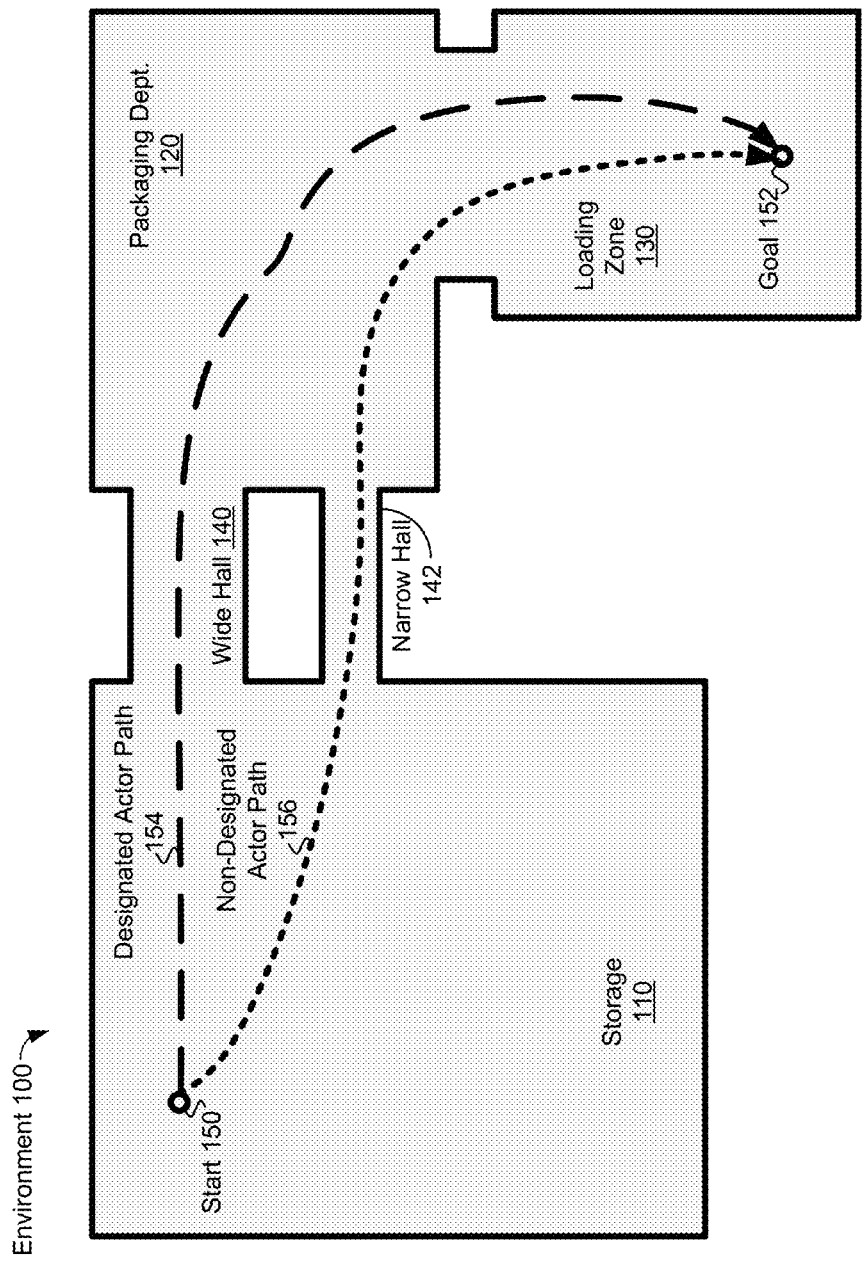
FIG. 1A shows an environment with a network of paths for both designated actors and non-designated actors, in accordance with an example embodiment.

An automated guided vehicle (AGV) can deliver items, such as parts or completed products, within indoor environments, such as warehouses, hospitals and/or data centers. Some AGVs can usefully co-operate with human workers. When AGV's are deployed to a new facility, they can calculate possible paths to and from delivery locations using standard path planning algorithms. Given a map of an environment, a mechanical/robotic actor can easily compute an optimal path between any pair of points A and B using one or more route planning algorithms.

However, these optimal paths may not be desirable to humans working alongside the AGVs. An AGV can classify actors in the environment as either "designated actors" or "non-designated actors", where the AGV tracks paths taken by designated actors, and may or may not track paths taken by non-designated actors. For example, rather than taking the calculated optimal path, a (non-designated) AGV, mechanical actor, robotic actor, or human actor may want to take routes travelled by one or more designated actors, perhaps for efficiency, safety, convenience, and/or other reasons. The designated actors can include one or more human actors, a group of robotic/mechanical actors, and/or a group of both human and robotic/mechanical actors, such as a group made up of all actors who had been working within the environment for at least a predetermined amount of time (e.g., two weeks, a month, 6 months, a year).

A path taken by designated actors may differ from a path selected for mathematical optimality. For example, designated actors may be guided by lines painted on the floor, which robots and/or other non-designated actors may not always be aware of and/or understand. Also, humans and perhaps other designated actors can tend to follow traveling conventions within the environment, such as always traveling clockwise, or staying to the right (or left) when traversing an aisle. In guiding non-designated mechanical/robotic actors to follow routes taken by the designated actors, it may be difficult, error-prone, and time consuming to manually program in lane information, traveling rules and/or preferred routes utilized by the designated actor.

A (non-designated) actor, such as an AGV or human, can be informed about a "route network" of paths taken by a designated group of actors within the environment. The route network can be based on location data obtained about actors operating within the environment, where the location data can indicate one or more locations traversed by an actor in the environment, perhaps as a given time. For example, if actor A1 traveled from location L1 to location L2 within environment E1 at 6 PM (18:00 military time) on Jan. 2, 2015, then location data can include data indicating that A1 traveled from L1 to L2 (perhaps via additional intermediate locations) at 6 PM (or 18:00) on Jan. 2, 2015. A type of actor can be stored with the location data as well; e.g., if A1 is a human actor named "Chris V.", then the location data can indicate that human actor Chris V. visited locations L1 and L2 and/or traveled from L1 to L2 at 6 PM on Jan. 2, 2015. Other representations of location data are possible.

The route network of paths can include data about one or more paths, each having a starting location and/or an ending location in the environment. The route network can be represented as a graph generated from the location data, where nodes represent locations in the environment and/or on a path of the one or more paths, and where an edge between nodes represents part or all of a path of the one or more paths between the locations represented by the nodes. In some embodiments, the edges can be weighted, where a weight of an edge can indicate if a corresponding (part of a) path is used by a designated actor, how many times designated actor(s) used the corresponding (part of a) path, a percentage or other ratio indicating how often the path is taken by designated actors, or some other information.

For example, the percentage weight PW for a path P from node N1 where node N1 is traversed N times by designated actors can be determined as PW=N(P)/N*100%, if N>0; or 0% if N=0, where N(P) is the number of times a designated actor chose path P to traverse node N1. If the percentage weights are used as weights in the route network, the weights for node N1 will add up to either 0%, if N1 is not traversed by a designated actor, or 100% if the node has been traversed by a designated actor. N(P) and N values, and correspondingly PW values, can change as a set of designated actors change.

The designated group of actors can provide location data while within the environment and the route network can be determined from this location data. By using location data obtained from the designated group of actors, a computing device, such as but not limited to a computing device aboard or otherwise associated with an actor, can infer the route network for an environment, based on the location data indicating how designated actors actually move in the environment. The route network can include many traveled paths, regions to avoid, and even traffic rules ("stay to the right").

The location data can come from radio frequency identification (RFID) or other locatable tags worn by human (and perhaps other) actors in the environment, by handheld device localization (using tablets, smart phones, and/or other mobile computing devices used in the environment), sensors mounted to objects in the environment, and/or sensors aboard vehicles utilized as actors (including but not limited to designated actors). Then, non-designated actors can use the route network when traveling within the environment. For example, an AGV can be programmed to learn and perhaps use the route network.

Automated Route Network Discovery Using Paths Taken by Designated Actors

FIG. 1A shows an environment 100 with a network of paths for both designated actors and non-designated actors, in accordance with an example embodiment. Environment 100 is an example indoor environment that includes storage 110, packaging department 120, and loading zone 130, with storage 110 and packaging department 120 connected by wide hall 140 and narrow hall 142.

In the example shown in FIG. 1A, an actor in environment 100 is instructed to deliver material from start 150 to goal 152 while passing through packaging department 120. A non-designated actor may select path 156 through narrow hall 142 as being a (nearly) optimal path with respect to distance between start 150 and goal 152 via packaging department 120. However, location data obtained from designated actors in environment 100 indicates the use of path 154 via wide hall 140. For example, the designated actors may have observed that material moved from start 150 to goal 152 is often too large to comfortably pass through narrow hall 142, and so chosen to use path 154. In other examples than shown in FIG. 1, the environment can be partially or completely outdoors.

Non-designated actors that have learned the route network will be able to better operate around designated actors and minimize, if not eliminate, problems with the existing traffic flows. In some cases, robotic/mechanical actors can be programmed to "follow the route network" to increase and/or harmonize interactions with designated actors. Alternatively, robotic/mechanical actors can be programmed to "avoid the route network" to minimize risk of collisions and interfering with designated actors; e.g., avoid the route network while learning the route network, while moving slowly such as during training or when moving heavy and/or bulky items, while damaged/injured, while transporting and/or working with hazardous materials, etc.

Figure 1B:
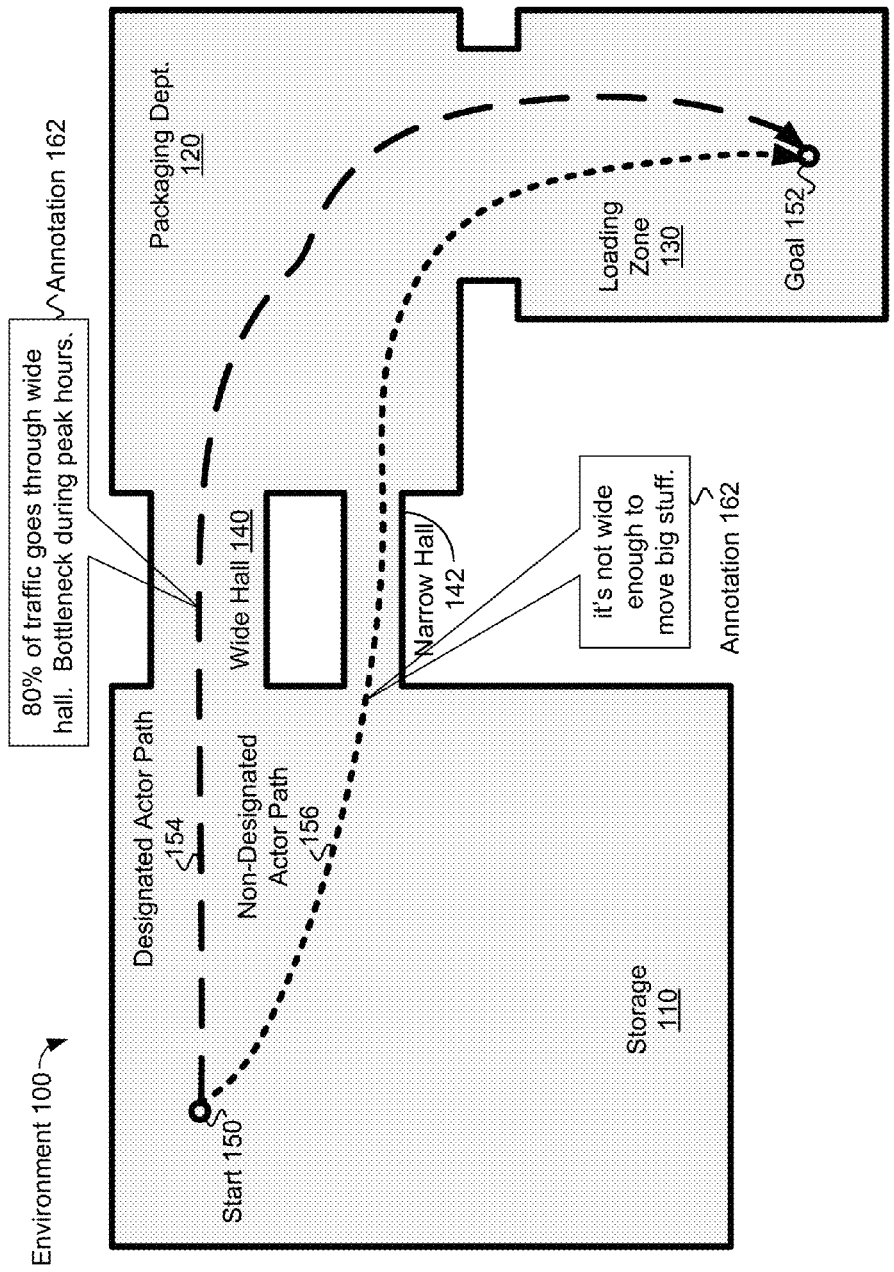
FIG. 1B shows an environment with an annotated network of paths for both designated actors and non-designated actors, in accordance with an example embodiment.

FIG. 1B shows an environment 100 with annotations 160, 162 related to the path network used by both designated actors and non-designated actors, in accordance with an example embodiment. The route network can be annotated with one or more annotations, where the annotations can provide commentary and information about environment 100 and/or paths in environment 100. Annotations can indicate information why a particular path is taken, traffic flow data, environmental conditions, and/or other commentary about the environment and/or paths in the route network. As examples, annotation 160 indicates that narrow hall 142 is not preferred since "it's not wide enough to move big stuff" and annotation 162 indicates that "80% of traffic goes through wide hall" and that wide hall 140 is a "Bottleneck during peak hours".

Figure 1C:
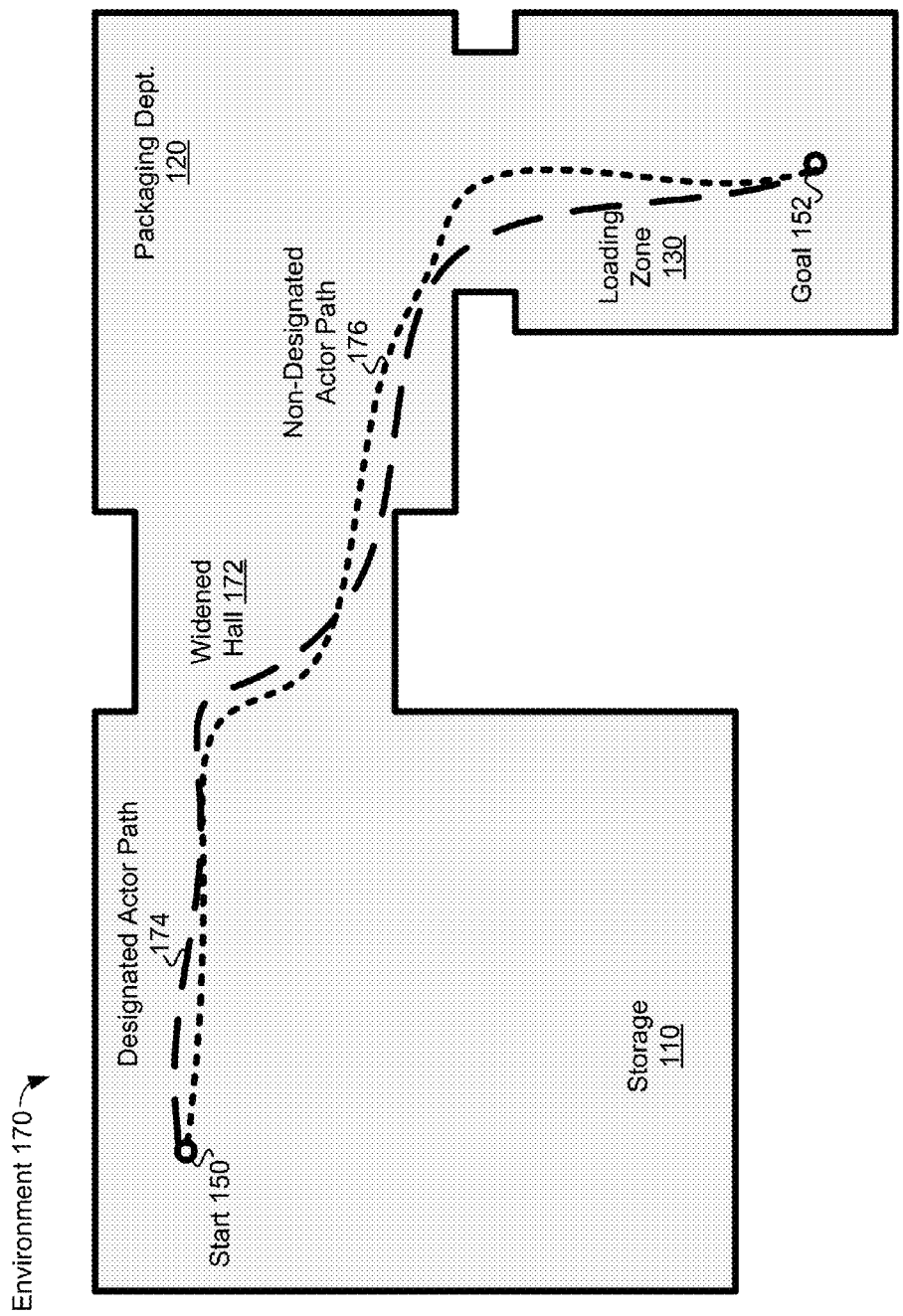
FIG. 1C shows a modified version of the environment of FIG. 1A and a network of paths for both designated actors and non-designated actors, in accordance with an example embodiment.

FIG. 1C shows a modified environment 170 and a network of paths for both designated actors and non-designated actors, in accordance with an example embodiment. Route network information, including annotations, can be used to change the environment. In the example of FIG. 1C, the route network information related to wide hall 140 and narrow hall 142 provided in annotations 160, 162 of FIG. 1B can lead to modifying environment 100 to permit "big stuff" to pass through the area of narrow hall 140 and take a shorter path to goal 152 than going via wide hall 140.

FIG. 1C shows environment 170, which is a modification of environment 100 (shown in FIGS. 1A and 1B) where wide hall 140 and narrow hall 142 have been combined into widened hall 172. In other aspects, environments 100 and 170 are the same e.g., storage 110, packaging department 120, loading zone 130 are the same for both environments 100 and 170.

Changes in an environment can lead to changes in paths used by actors moving in the environment. For example, FIG. 1C shows that designated actor path 174 and non-designated actor path 176 have both changed in comparison with respective designated actor path 154 and non-designated actor path 156 (paths 154, 156 shown in FIG. 1B) to move roughly diagonally through widened hall 170 to shorten the distance to goal 152. Further, the changes in the environment have made non-designated actors more likely to follow designated actor path 174 and non-designated actor path 176 in comparison to designated actor path 154 and non-designated actor path 156 shown in FIGS. 1A and 1B. As such, observing, commenting, and analyzing paths taken by designated and non-designated actors in an environment, such as environment 100 can lead to changes in the environment which enable more efficient paths to be utilized by actors in the environment, such as shown in FIG. 1C.

Figure 2A:
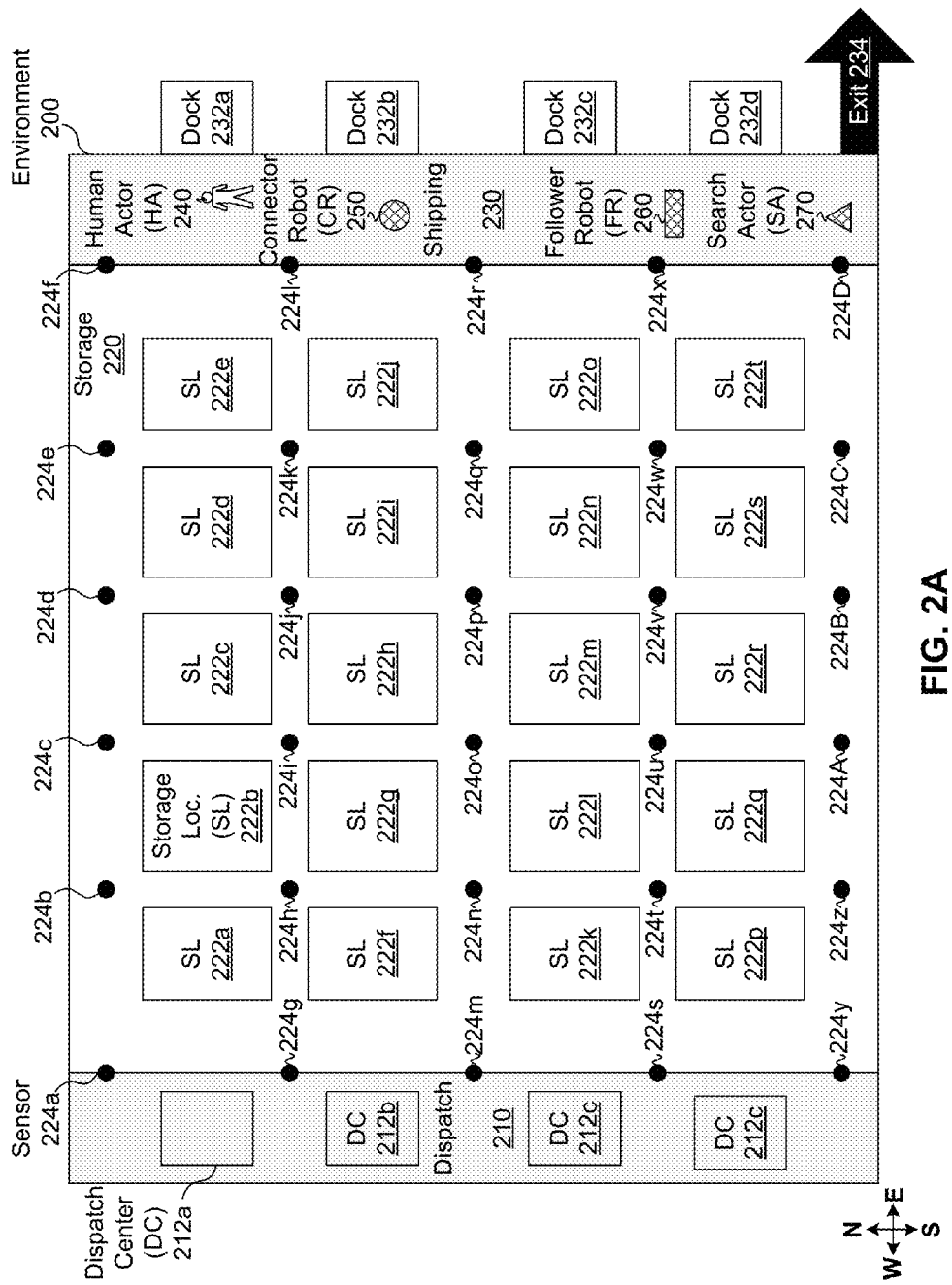
FIG. 2A depicts a warehouse environment, in accordance with an example embodiment.

FIG. 2A depicts a warehouse environment 200, in accordance with an example embodiment. Environment 200 includes dispatch 210, storage 220, and shipping 230. Dispatch 210 include four dispatch centers (DCs) 212a, 212b, 212c, 212d where at least human actors receive orders for obtaining item(s) from storage 220 for transport out of environment 220 via shipping 230. Storage 220 includes twenty storage locations (SLs) 222a-222t arranged in four rows. The first (northernmost), second, third, and fourth (southernmost) rows of storage locations in storage 220 respectively include respective groups of storage locations 222a-222e, 222f-222j, 222k-222o, and 222p-222t. The three horizontal hallways below the fourth row of storage locations and above each the first row and the third row of storage locations are wider than the two horizontal hallways between the first and second rows of storage locations and between the third and fourth rows of storage locations.

Storage 220 can be monitored using sensors, such as sensors 224a-224z and 224A-224D shown in FIG. 2A. Some or all of sensors 224a-224z and 224A-224D can be used to locate actors and perhaps items within storage 230. Sensors 224a-224z and 224A-224D can include, but are not limited to, video sensors, e.g., cameras, infrared sensors; audio sensors, e.g., microphones; movement sensors, temperature sensors, and/or other sensors; e.g., sensors 520 as discussed below in more detail with respect to FIG. 5A.

Shipping 230 includes four docks 232a, 232b, 232c, 232d where vehicles can bring items into and take items out from environment 200. Shipping 230 also includes exit 234 used for human actors working in environment 200 to enter and exit environment. For example, exit 234 can lead to a parking lot, bus stop, or other transportation for the human actors to travel to and from environment 200.

Environment 200 typically can have four types of actors: human actors (HAs) 240, connector robots (CRs) 250, follower robots (FRs) 260, and search actors (SAs) 270.

Figure 2B:
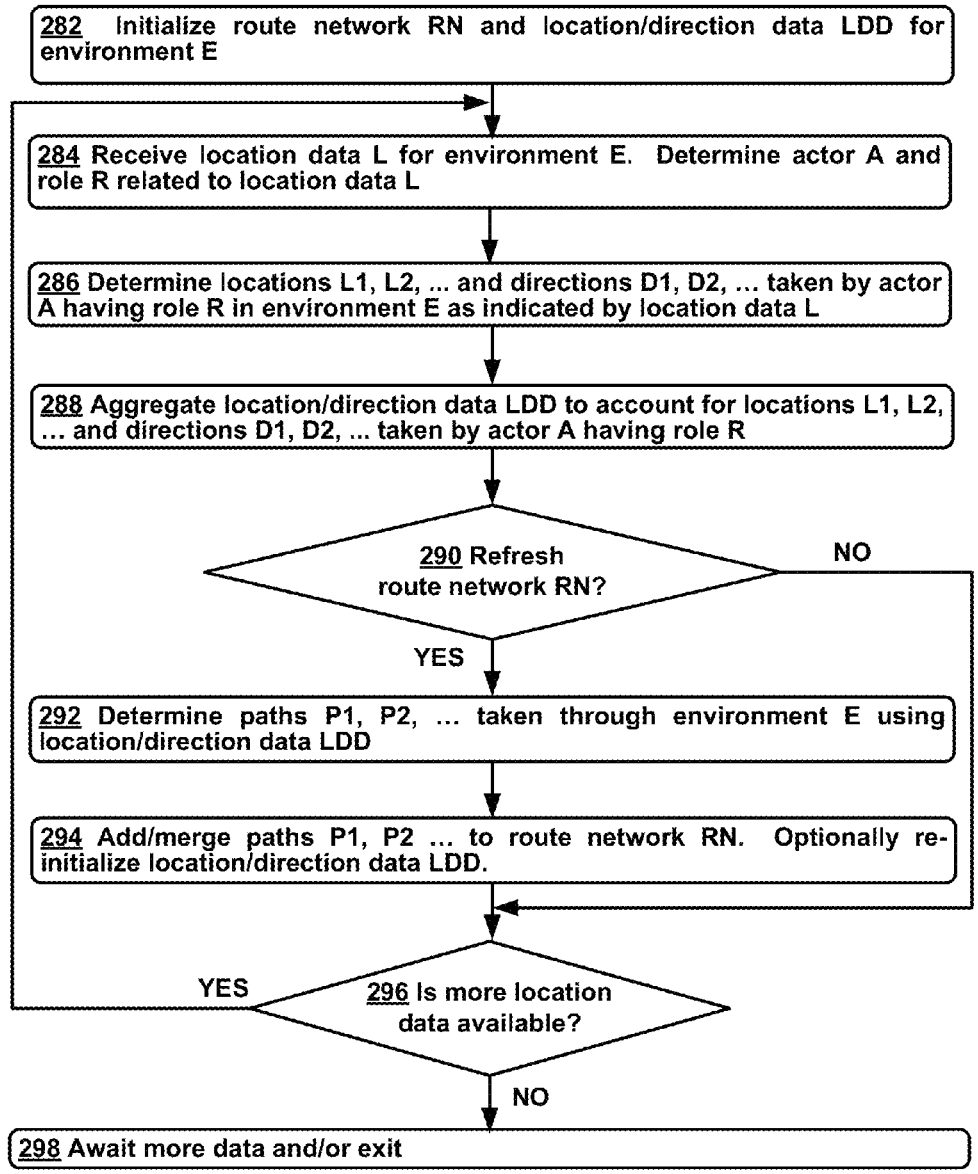
FIG. 2B is a flowchart of a method, in accordance with an example embodiment.

FIG. 2B is a flowchart of method 280 for generating route networks from location data, in accordance with an example embodiment. The location data can be provided for an environment; for example, the location data can be provided using sensors 224a-224D in environment 200. The location data can be provided for actors, such as human actors and robotic actors, located and/or moving in the environment. As discussed above, the actors can have roles; e.g., in environment 200, a robotic actor can take the role of connector robot 250, follower robot 260, search actor 270, or perhaps some other role.

Method 280 can be carried out by a computing device. Example computing devices include, but are not limited to, computing device 500 discussed with respect to FIG. 5A, a computing device aboard a herein-described robot, robotic actor, and/or robotic device, including but not limited to a computing device aboard a follower robot, a connector robot, a robotic search actor, and/or a robotic guide actor, a computing device inside or otherwise associated with a building and/or other environment, and/or other computing device(s).

Method 280 begins at block 282, where the computing device can initialize a route network RN and location/direction data LDD for environment E. Route network RN can include data about one or more paths, each having a starting location and/or an ending location in the environment. Route network RN can be represented as a graph generated from the location data, where nodes represent locations in the environment and/or on a path of the one or more paths, and where an edge between nodes represents part or all of a path of the one or more paths between the locations represented by the nodes. Other representations of route network RN are possible as well.

In some embodiments, route network RN can be initialized to a null graph or other data structure(s), object(s), or software entities to represent a null (or empty) route network. In other embodiments, route network RN can be initialized to reflect some or all structures in an environment; e.g., to indicate information about storage 110, packaging department 120, loading zone 130, wide hall 140, and/or narrow hall 142 of environment 100 shown in FIG. 1A. In still other embodiments, route network RN can be initialized by copying part or all of another route network. Other techniques to initialize route network RN are possible as well.

Location/direction data LDD for environment can include data about locations visited and directions taken by actors A1, A2 . . . moving in environment E. Location/direction data LDD can specify locations in environment E based on a coordinate system. For example, LDD can specify locations using latitude/longitude coordinates, a grid or other coordinate system specific to environment E, and/or another coordinate system. In other examples, location/direction data LDD can be based on another technique for specifying locations in environment E, such as an (exhaustive) list of (named) locations in environment E.

A location L represented in location/direction data LDD can be associated with one or more directions D1, D2 . . . taken by actors A1, A2 . . . reaching location L in environment E. Directions D1, D2 . . . can be specified as compass directions (e.g., east, south-southwest), degrees, radians, or by some other techniques. In some cases, an indication that actor(s) have stopped (not moved in any direction) at location L can be recorded as part of directions D1, D2, . . . .

In some embodiments, location/direction data LDD can also indicate statistics about how many actors have traveled through or stopped at a location L represented in LDD, statistics about how many actors went in direction D1, D2 . . . or stopped at the location L, statistics about how many actors having a specific role (e.g., human actor, robotic actor) have traveled through or stopping at the location L, statistics about a specific actor's movements through or stopping at the location L represented in LDD, and so on.

For example, suppose LDD represents locations using a 20×20 coordinate grid using (X, Y) coordinates, with the X coordinate increasing as locations move to the east and the Y coordinate increasing as locations move to the north, LDD represents directions using compass directions, and maintains counters for actors having at least roles R1, R2, and R3 within environment E. At an example location (15, 15) in environment E, LDD can have counters for the location such as:

Location (15, 15)—total visits counter for actors passing through location=200
    Count of actors of role R1 passing through location=55
    Count of actors of role R2 passing through location=103
    Count of actors of role R3 passing through location=42
Total stops counter for actors stopping at location=28
    Count of actors of role R1 stopping at location=4
    Count of actors of role R2 stopping at location=21
    Count of actor of role R3 stopping at location=3
Count of actors passing through location and going north=20
    Count of actors of role R1 passing through location and going north=10
    Count of actors of role R2 passing through location and going north=3
    Count of actors of role R3 passing through location and going north=3
Count of actors passing through location and going north-northeast=2 . . . .
Many other representations, counters, statistics, and information can be included in route network RN and/or location/direction data LDD.

In some embodiments, location/direction data LDD can be initialized to an empty set of data. In other embodiments, location/direction data LDD can be initialized to reflect some or all structures in an environment; e.g., to indicate information about storage 110, packaging department 120, loading zone 130, wide hall 140, and/or narrow hall 142 of environment 100 shown in FIG. 1A. In still other embodiments, location/direction data LDD can be initialized by copying part or all of other location/direction data and/or by obtaining information from a route network such as route network RN; e.g., location/direction data LDD can be updated to indicate which locations in location/direction data LDD correspond to nodes in route network RN and/or which directions in location/direction data LDD correspond to paths in route network RN. Other techniques to initialize location/direction data LDD are possible as well.

At block 284, the computing device can receive location data L for environment E and can determine actor A and role R related to location data L. For example, location data L can indicate one or more locations within environment E that were stopped at and/or visited by an actor A1 having role R1 and associated times that actor A1 was at the location. For example, suppose actor A1 visited location (15, 15) in the example environment mentioned above, moved to location (16, 15) and then stopped. An example of five location data points for A1's movements observed every five seconds can be:

Location data 1: Actor A1 at location (15, 15) at 10:00:00 AM
Location data 2: Actor A1 at location (16, 15) at 10:00:05 AM
Location data 3: Actor A1 at location (16, 15) at 10:00:10 AM
Location data 4: Actor A1 at location (16, 15) at 10:00:15 AM
Location data 5: Actor A1 at location (16, 15) at 10:00:20 AM Many other examples of location data, location data points, and representations of location data are possible as well.

At block 286, the computing device can determine locations L1, L2 . . . and directions D1, D2 . . . taken by actor A having role R in environment E as indicated by location data L. Using the example five location data points, the computing device can determine that actor A1 visited locations (15, 15) and (16,15) and moved east from (15, 15) to (16,15). The computing device can also determine that actor A1 stopped at location (16, 15) based on maintaining a fixed location for a threshold period of time (e.g., 10 seconds, 33 seconds, 1.5 minutes); in this example, the five location data points indicate that A1 stopped at location (16, 15) for at least 15 seconds from 10:00:05 to 10:00:20.

At block 288, the computing device can aggregate location/direction data LDD to account for locations L1, L2 . . . and directions D1, D2 . . . taken by actor A having role R. Again using the above-mentioned five example data points, the computing device can update location/direction data LDD to aggregate locations L1, L2 . . . and directions D1, D2 . . . taken by actor A having role R into location/direction data LDD, such as but not limited to incrementing a number of counters (or similar data). Examples of these counters include: counter(s) to indicate actor A1 passed through and/or departed location (15, 15), counter(s) to indicate an actor of role R1 passed through and/or departed location (15, 15), counter(s) to indicate that the actor A1 passed through and/or departed location (15, 15) moving east, counter(s) to indicate that an actor of role R1 passed through and/or departed location (15, 15) moving east, counter(s) to indicate that an actor of type T passed through and/or departed location (15, 15) moving east, a total visits counter for location (16, 15), a total departures counter for location (16, 15), a counter to indicate actor A1 stopped at location (16, 15), a counter to indicate actor A1 arrived at location (16, 15) from the west, a counter to indicate an actor of role R1 stopped at location (16, 15), a counter to indicate an actor of role R1 arrived at location (16, 15) from the west, a total stops counter at location (16, 15), a total arrivals counter for location (16, 15), a total visits counter at location (16, 15) and perhaps other counters, value, statistics, and/or other data.

An actor can visit a location by either stopping at the location or passing through the location. For example, the five example data points indicate one visit (a pass through) at location (15, 15) and one visit (a stop) at location (16, 15), so a total visits counter for location (15, 15), a total visits counter for location (16, 15), and a total stops counter for location (16, 15) can each be incremented based on this location data.

At block 290, the computing device can determine whether route network RN is to be refreshed. Route network RN can be refreshed on a periodic basis (e.g., every day, every hour, every 15 minutes, every 30 seconds), as requested, after a pre-determined amount of location data L has been aggregated into location/direction data LDD, and/or refreshed based on other criteria.

If route network RN is to be refreshed, the computing device can proceed to block 292. Otherwise, route network RN is not to be refreshed and the computing device can proceed to block 296.

At block 292, the computing device can determine paths P1, P2 . . . taken through environment E using location/direction data LDD. The computing device can determine possible endpoints for paths P1, P2 . . . by scanning location/direction data LDD for locations EP1, EP2 . . . that have data that indicate location(s) were likely to be stopped at, and therefore can be an endpoint of a path. Data in location/direction data LDD that indicate a location EP is likely to be stopped at include a total stops counter for location EP exceeds a threshold counter value, data that indicates that a stopping ratio SR exceeds a threshold ratio value, where SR for location EP=total stops counter for location EP/total visit counter at location EP, and/or by other data related to determining an endpoint EP in location/direction data LDD.

In some cases, endpoints for paths P1, P2 . . . can be related to paths taken by particular actor(s), particular type(s) of actors and/or by particular role(s) of actors. In these cases, counters related to the particular type(s) and/or role(s) of actors can be examined, rather than total counters as discussed in the paragraph prior. For example, to look for endpoints for paths taken by actors of type T (or role R), the computing device can scan location/direction data LDD for locations to determine if a counter of stops by actors of type T (role R) exceeds a threshold number of stops value, or if a stopping ratio SR(T) exceeds a threshold ratio value, where SR(T) for location EP=stops counter for actors of type T for location EP/visits counter for actors of type T at location EP or if a stopping ratio SR(R) exceeds a threshold ratio value, where SR(R) for location EP=stops counter for actors of role R for location EP/visits counter for actors of role R at location EP, and/or by other data related to determining an endpoint EP in location/direction data LDD for actors of type T (or role R). Other points than endpoints can be specified in route network RN; for example, intersection points between paths can be determined and added to route network RN.

A next direction for a path going through location EP, NL(EP), can be determined by examining data in location/direction data LDD that indicate actors visiting location EP arrived and/or departed from location EP by a direction D that has a counter whose value exceeds a threshold direction value, data that indicate actors visiting a location EP either arrived or left from location EP by direction D that has a threshold value that exceeds a threshold direction value, data that indicate direction ratio DR(D) exceeds a threshold direction-ratio value, where direction ratio DR(D) for direction D=(arrivals or departures counter for direction D at location EP)/(total arrivals or total departures for location EP), and/or by other data related to determining a next direction at location EP in location/direction data LDD for actors of type T (or role R).

Next directions for specific type(s) (or roles) of actors can be determined as well. For example, to look for a next direction of a paths taken by actors of type T (or role R) arriving at or leaving from location EP, the computing device can scan location/direction data LDD for locations to determine if a counter of arrivals or departures to/from location EP by direction D for actors of type T (role R) exceeds a threshold number of arrivals or departures value, or if a direction ratio DR(D, T) or DR(D, R) for location EP exceeds a threshold direction-ratio value, where direction ratio DR(D, T) for direction D=(arrivals or departures counter for direction D for actors of type T at location EP)/(total arrivals or total departures for actors of type T at location EP), direction ratio DR(D, R) for direction D=(arrivals or departures counter for direction D for actors of role R at location EP)/(total arrivals or total departures for actors of role Rat location EP), and/or by other data related to determining a direction arriving at or departing from EP in location/direction data LDD for actors of type T (or role R).

Once a next direction D from location EP is determined, then a path can be generated by moving in the direction of next direction D from location EP to find a next location (NL) represented in location/direction data LDD. Let a path begin at a location EP1 and determine a next location NL(EP1) by first determining a next direction to go from location EP1, ND(EP1), and then determining next location NL(EP1) by moving in direction ND(EP1) from EP1 until reaching a location represented in location/direction data LDD. In the context of the example 20×20 LDD mentioned above, suppose EP1=(16, 15) and the next direction for EP1 is west, then the next location determined moving west from EP1 would be (15, 15), and so NL(EP1)=(15, 15). Then a path Px can be determined by starting at an endpoint EP1, determining NL(EP1), then determining NL(NL(EP1)), which is the next location of NL(EP1), and so on until reaching (another) endpoint EP2, so path Px would include the points EP1, NL(EP1), NL(NL(EP1)), NL(NL(NL(EP1))), . . . . . , EP2. In some cases, path Px can be determined by curve fitting or otherwise determining one or more curves based on some or all of the points EP1, NL(EP1), NL(NL(EP1)), NL(NL(NL(EP1))), . . . . , EP2. Then, Px can be represented as the curve(s) used to fit the points EP1, NL(EP1) . . . and perhaps range or error data indicating how much the curve(s) differ from the points EP1, NL(EP1) . . . determined for path Px. Path Px can also include data about a frequency of actors utilizing part or the entire path; e.g., per-point data about actor frequency, average actor frequency along the path, data about frequency of actors of actors of type T (and/or role R) along the path, and other data related to the frequency of actors utilizing path Px. Other determinations of path Px are possible as well.

At block 294, the computing device can add/merge paths P1, P2 . . . to route network RN. For example, if a path Px determined from location/direction data LDD has an endpoint EP that corresponds to an end point EPRN of a path PRN in route network RN, and paths Px and PRN track each other, then path Px can be merged into path PRN in route network RN and/or deleted as a duplicate of PRN. If path Px differs from path PRN (e.g., more than a threshold number of points differ between Px and PRN, paths Px and PRN have overlap of less than a threshold amount of overlap, etc.), then path Px can be added to route network RN as a new path or partially merged with path PRN. In some embodiments, once data for path Px has been used to update route network RN (or perhaps been discarded), data for at least path Px can be removed from location/direction data LDD. In other embodiments, after (most or) all of the data from location/direction data LDD has been used to update route network RN, location/direction data LDD can be reinitialized.

At block 296, the computing device can determine whether more location data is available. If more location data is available, the computing device can proceed to block 284. Otherwise, more location data is not available and the computing device can proceed to block 298.

At block 298, the computing device can exit or wait for more location data (or perhaps some other condition(s), such as but not limited to receiving user input to exit or wait longer). The wait can be bounded by some pre-determined period of time; e.g., 5 seconds, 30 minutes, 2 hours, a week. If that period of time expires and/or other condition(s) obtain, the computing device can exit and method 280 can be completed.

Other techniques for generating route networks from location data are possible as well. The route network RN can be used by robotic and/or other actors to move within an environment. For example, if an actor AT is to travel from a starting location to an ending location, then actor AT can query, search, or otherwise use the route network RN to find paths taken by designated actors from the starting location to the ending location. For example, actor AT can query route network RN to determine paths taken by designated actors between the starting location and the ending location. Then, actor AT can follow, avoid, connect, or otherwise travel from the starting location to the ending location based on the paths taken by designated actors.

As another example, a computing device can determine a starting and ending location and a set of designated actors operating within an environment. The computing device can search a route network to find paths taken by designated actors related to the starting and ending locations, and use paths found in the route network indicated as being taken by the designated actors, to select a path between the starting and ending locations; e.g., follow, avoid, connect, or otherwise travel based on the paths taken by the designated actors found in the route network. Then, the computing device can provide the selected path as part of an instruction to a robotic actor to travel between the starting and ending locations. Many other uses of the route network are possible as well.

FIGS. 3A-3F show scenario 300 with actors generating path networks in the warehouse environment of FIG. 2A based on paths from various groups of designated actors, in accordance with an example embodiment. In scenario 300, human actors 240 work to fulfill orders arriving at dispatch 210 to ship items found in storage 220 via vehicles arriving at shipping 230. Carrier robots 250 and follower robots 260 can convey items, and perhaps human actors, between various regions within environment 200. Search actors 270, which can include humans and/or robotic actors, can be used to find missing items, and perhaps actors, within environment 200. In at least some of the examples discussed in scenario 300, human actors can act as designated actors for robotic actors.

Figure 3B:
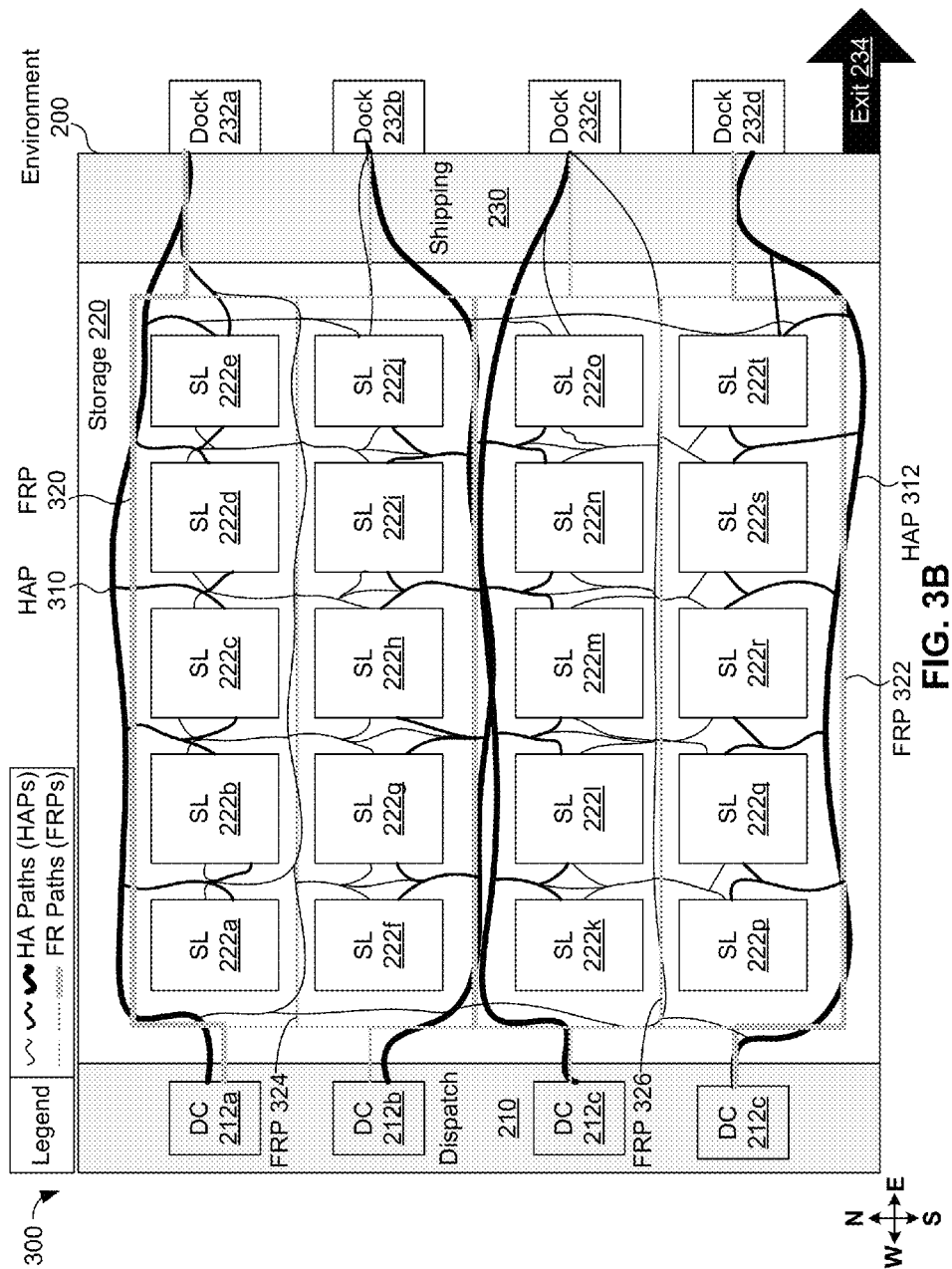

FIG. 3A shows paths taken by human actors in environment 200 using dark lines as indicated in the legend. In FIGS. 3A-3F, a relatively-thick line for a path indicates a higher usage of the path than a path illustrated using a relatively-thin line. That is, thicker lines are used to indicate higher-usage paths, while thinner lines indicate lower-usage paths.

Human actors of scenario 300 are asked to obtain orders at one of four dispatch centers 212a, 212b, 212c, 212d requesting items from storage 220 to be shipped via one or more of docks 232a, 232b, 232c, 232d to fulfill the orders. The human actors are also instructed to follow the wide hallways as much as possible to allow for easier movement of both human and robotic actors. As such, FIG. 3A shows higher-usage paths taken by human actors include a path between dispatch center 212a to dock 232a via a wide hallway above the first row of storage locations, a path between dispatch centers 212b, 212c to docks 232b, 232c via a wide hallway between the second and third rows of storage locations, and a path between dispatch center 212d to dock 232d via a wide hallway below the fourth row of storage locations.

FIG. 3B shows paths taken by human actors, shown a dark color, and paths taken by follower robots, shown in a grey color, taken through environment 200 during scenario 300. A robotic actor can carry out the role of a follower robot by following instructions such as the example instructions shown below in Table 1. The example instructions can enable a follower robot to follow paths of designated actors operating in environment 200.

TABLE 1

| | |
|---|---|
| 0001 | Designated_actor_group = {human actors} |
| 0002 | Designated_region = {coordinates for environment 200} |
| 0003 | Default movement instructions = { |
| 0004 |    follow designated_actor_group within designated_region |
| 0005 | } |

The example instructions of Table 1 specify that a designated actor group for follower robots includes the set of "human_actors", a designated region for follower robots is indicated by "coordinates for environment 200" and that, by default, follower robots are to "follow [the] designated_actor_group within [the] designated_region". In scenario 300, human actors can find items within environment 200 and load a following follower robot with items that are found. Also in scenario 300, follower robots can follow the paths taken by human actors; i.e., the designated actors, to enable autonomous behaviors for follower robots. For example, the follower robots can follow paths taken by human actors to obtain items from storage 220 and take those items to shipping 230 autonomously.

In some scenarios, a follower robot can obtain the item(s) upon direction from a human actor and/or via other instructions than shown in Table 1. In such scenarios, a robotic actor that is taking direction from a human actor, such as the follower robot mentioned in the previous sentence, can be considered to be a human-controlled actor. Then, actors can be classified as having a human-actor type, a robotic-actor type, and a human-controlled actor type. In some cases, an actor can have multiple types; e.g., a follower robot taking direction immediately from a human actor can be classified as having both a robotic-actor type and a human-controlled actor type.

FIG. 3B indicates that follower robot paths generally mirror human paths, as follower robots are instructed to follow human actors. For example, FIG. 3B indicates that higher-usage follower robot paths, such as follower robot paths 320 and 322, follow higher-usage human actor paths through the three above-mentioned wide hallways through storage 220, while lower-usage follower robot paths, such as follower robot paths 324 and 326, follow higher-usage human actor paths lower-usage paths through storage 220 in general accord with human actor lower-usage paths.

Figure 3C:
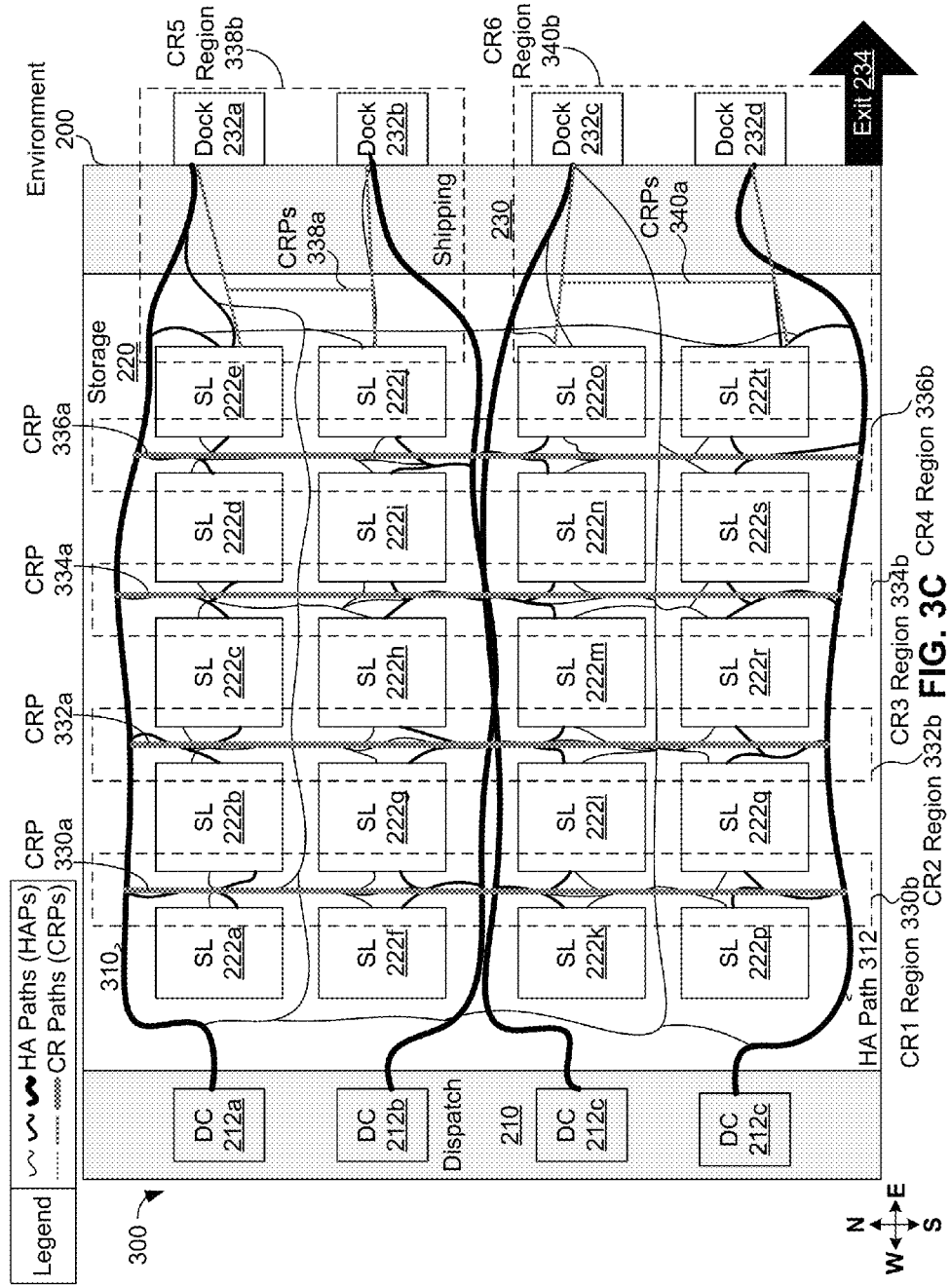

FIG. 3C shows paths taken by human actors, shown a dark color, and paths taken by connector robots, shown in a grey color, taken through environment 200 during scenario 300. A robotic actor can carry out the role of a connector robot by following instructions such as the example instructions shown below in Table 2. The example instructions can enable a connector robot to connect with paths of designated actors operating in a particular region of environment 200.

TABLE 2

| 0001 | Designated_actor_group = {human_actors && follower_robots} |
| 0002 | Designated_region = {coordinates for specific CR Region} |
| 0003 | Default movement instructions = { |
| 0004 |    connect paths of designated_actor_group |
| 0005 |      within designated_region |
| 0006 | } |

The example instructions of Table 2 specify that a designated actor group for connector robots includes the set of "human_actors" and the set of "follower_robots". Paths taken by follower robots generally follow those of human actors and so are not shown in FIG. 3C for simplicity.

Each connector robot in scenario 300 operates in a designated region, as indicated on line 0002 of Table 2 above. For example, FIG. 3C shows that connector robot CR1 can operate within CR1 region 330b that covers the hall between the first (westernmost) and second columns of storage locations within storage 220. FIG. 3C indicates that respective connector robots CR2, CR3, CR4, CR5 and CR6 can operate within respective regions of CR2 region 332b, CR3 region 334b, CR4 region 336b, CR5 region 338b, and CR6 region 340b.

By default, connector robots are to "connect paths of [the] designated_actor_group within [the] designated_region". In scenario 300, a connector robot can locate one or more items within its region and take those item(s) to a designated actor (or actors); e.g., a human actor or follower robot at a point, such as an intersection point between paths of the designated actor(s) and the connector robot. For example, FIG. 3C shows that connector robot path 330a for connector robot CR1 intersects: human actor path 310 near the northwest corner of storage 220, human actor path 312 near the southwest corner of storage 220, and two other human actor paths. Each of connector robot paths 332a, 334a, 336a, 338a, 340a, and 342a intersect or nearly interest human actor paths at least one point. In scenario 300, at such intersection, or near intersection points, the designated actors can take the item(s) from the connector robot and convey the item(s) to shipping 230 or some other location. Other interactions between actors can occur at such points; e.g., an actor can await another actor, an actor can receive instructions to carry out another task.

Figure 3D:
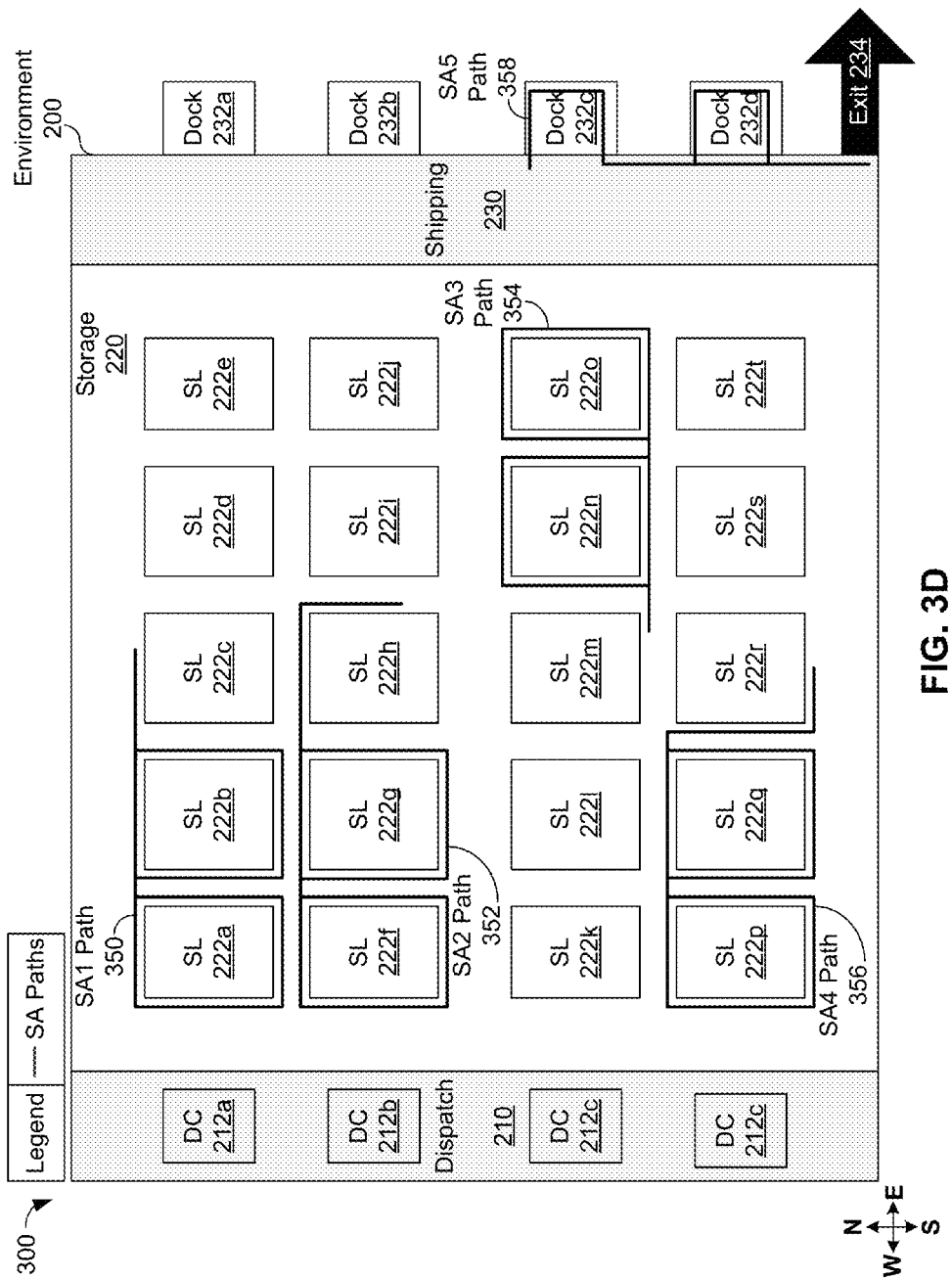

FIG. 3D shows paths taken by search actors taken during scenario 300. A robotic actor can carry out the role of a search actor by following instructions such as the example instructions shown below in Table 3. The example instructions can enable a robotic search actor to coordinate search efforts while minimizing retraced movements by avoiding paths of designated actors operating in environment 200.

TABLE 3

| 0001 | Designated_actor_group = {search_actors} |
| 0002 | Designated_region = {coordinates of storage 220} |
| 0003 | Default movement instructions = { |
| 0004 |   receive search_data // get info about searched-for item(s) |
| 0005 |   set searched_regions = NULL |
| 0006 |   set found = FALSE // item not found |
| 0007 |   do { |
| 0008 |     SL = select nearest storage location |
| 0009 |       NOT in searched_regions |
| 0010 |       AND avoid paths of designated_actor_group |
| 0011 |     if (SL != NULL) then // if there is a region to search |
| 0012 |       found = search region SL using search_data |
| 0013 |       searched_regions = searched_regions + SL |
| 0014 |     end if |
| 0015 |     found = communicate_found_data (found, |
| 0016 |       designated_actor_group) |
| 0017 |   } while ((SL != NULL) AND (found == FALSE)) |
| 0018 |   if (found == FALSE) then |
| 0019 |     report search unsuccessful |
| 0020 |   else |
| 0021 |     report search successful |
| 0022 |   end if |
| 0023 | } // end of default instructions |

Line 0001 of the example instructions in Table 3 specifies that a designated actor group for robotic search actors includes the set of "search_actors". The example default movement instructions for a robotic search actor include searching a designated region identified as "storage 220" on line 0002. Lines 0003 to lines 0023 of Table 3 indicate example default movement instructions for a robotic search actor. Line 0004 indicates that the search actor receives "search_data" identifying one or more searched-for items to be found within the designated region. Lines 0005 and 0006 set searched_regions and found variables used by the search actor to NULL and FALSE respectively.

Lines 0007 to 0017 are a loop for searching for the searched-for item(s). In the loop, a storage location SL is selected on lines 0008-0010 that is "nearest" to the search actor, not already been searched; e.g., "NOT in searched_regions" on line 0009, and not in the paths of the designated actor group; e.g., "AND avoid paths of designated_actor_group" on line 0010. By avoiding paths of other designated actors; e.g., other search actors, the search actor can minimize and perhaps eliminate retracing movements taken by other search actors in conducting a search. In scenario 300, the result of selecting storage location SL will either return a storage location to be searched or NULL if no storage location satisfies the above-mentioned constraints.

At line 0011, a test is made to determine if there is a storage location to search. If there is a storage location to search, at line 0012, storage location SL is searched using the search_data. If the search is successful, the found variable can be set to TRUE; otherwise, the found variable can be set to FALSE. At line 0013, storage location SL is added to the searched_regions variable. For example, searched_regions can be an object, list, or other data structure that can track regions visited by the search actor during a search.

At line 0015 of Table 3, the "found" results are communicated between search actors using a communicate_found_data function. In scenario 300, the communicate_found_data function communicates data stored in its first parameter; e.g., the value of the found variable, to actors designated by its second parameter; e.g., the designated_actor_group. The communicate_found_data function can return TRUE if any of the found data results communicated by the actors is TRUE, and can return false otherwise. In effect, lines 0015 and 0016 update the found variable using the communicate_found_data function to reflect the "found" status of the searched-for item(s) from all search actors.

At line 0017 of Table 3, a test is performed to see if storage location SL is not equal to NULL and if the found variable is equal to FALSE—if both conditions hold, the search actor repeats the while loop by returning to line 0007 for another loop iteration. Otherwise, if SL is NULL, which indicates that the search actor has no more storage locations to search that have not already been searched and have not been searched by other search actors. Additionally, if found is not FALSE; that is, found is TRUE. In either the event that SL is NULL or found is TRUE, the search actor has completed its search for the searched-for items.

Lines 0018 to 0022 enable the search actor to report the status of the search as either successful or unsuccessful based on the value of the found variable, to complete the default instructions for a robotic search actor. Similar instructions to those shown in Table 3 can be provided to humans acting as search actors. Many other techniques and instructions based on designated actor paths can be used to perform searches.

FIG. 3D shows a search for a searched-for item in progress using four search actors: SA1, SA2, SA3, and SA4 having taken respective paths 350, 352, 354, and 356. When the search started, search actors SA1, SA2, SA3, and SA4 respectively were near storage locations 222a, 222f, 222o, and 222p. In scenario 300, each search actor is searching a row of storage locations—search actor SA1 is searching the first row, search actor SA2 is searching the second row, search actor SA3 is searching the third row, and search actor SA4 is searching the fourth row. Based on their starting locations, each of search actors SA1, SA2, and SA4 are searching from west-to-east and search actor SA3 is searching from east-to-west. In scenario 30, each search actor has finished searching two storage locations and is proceeding to search a third storage location as indicated by paths 350, 352, 354, and 356.

Paths taken by robotic actors that are based on designated actor paths, such as the paths of follower robots, connector robots, and search robots of scenario 300, can be dynamically adjusted to changes within an environment, such as environment 200. For example, human actor behavior and corresponding paths can change during certain periods of a work day; e.g., at breaks, during meal times, and as part of a shift change. As such, robotic actors working with human actors can adjust paths during these periods.

Figure 3E:
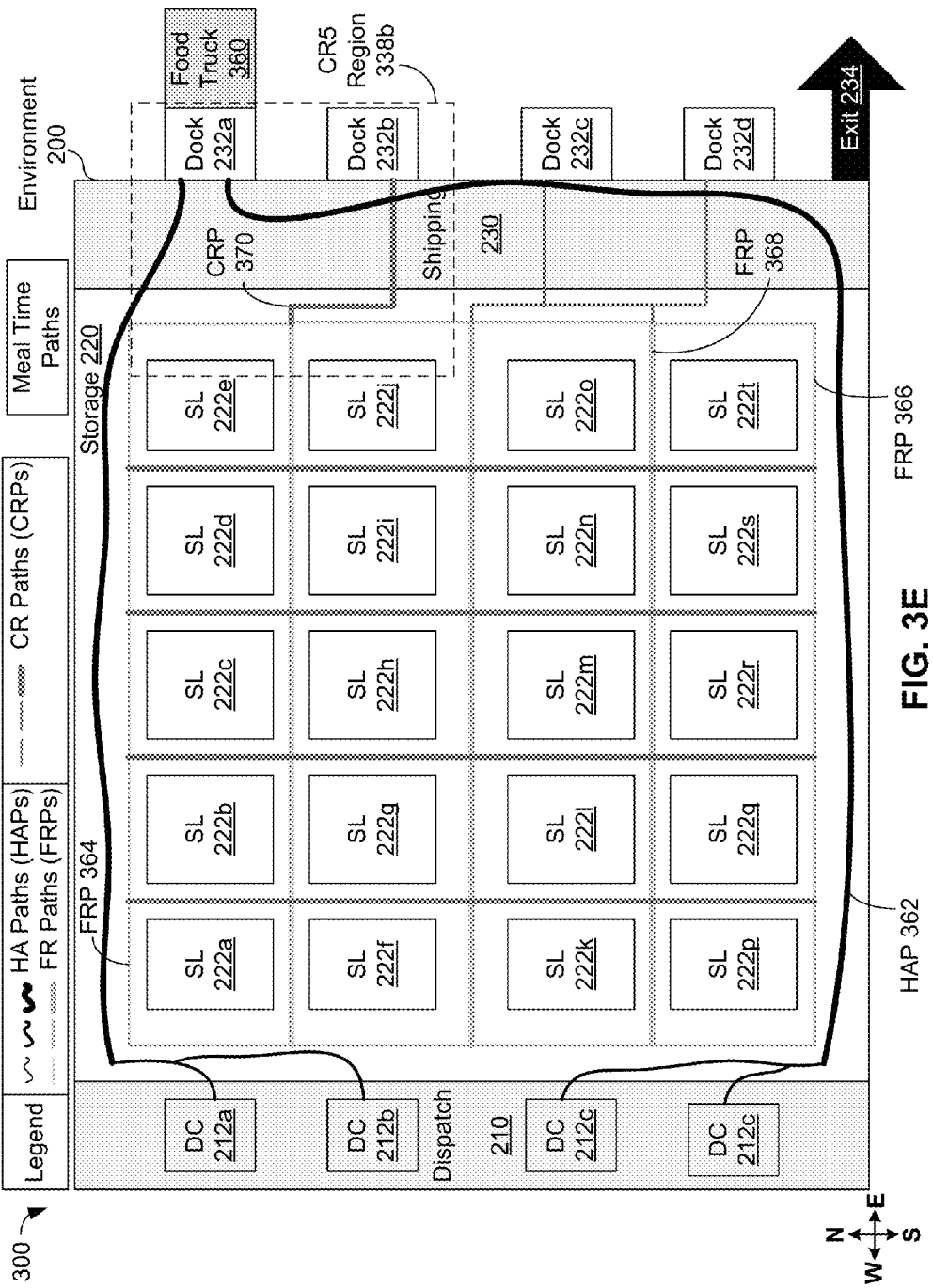

FIG. 3E shows human actor, follower robot, and connector robot paths during a meal time of scenario 300. In scenario 300, human actors eat at designated meal time break, which can start when food truck 360 arrives at a dock, such as dock 232a, of shipping 230. In scenario 300, human actors have been asked to take paths around the periphery of environment 200 to reach food truck 360, such as shown by human actor path (HAP) 362, in order to avoid interference with robotic actors working during the meal time.

During the meal time, robotic actors can change their behavior to both avoid paths likely taken by human actors going to and from food truck 360. Also, the robotic actors can continue to convey items within storage 220 and to docks not occupied by food truck 360; that is, to docks 232b, 232c, and 232d. For example, follower robots can reduce usage of paths in areas used by human actors going to and from food truck 360, such as indicated by follower robot paths (FRPs) 364 and 366, which are shown as being relatively-thin, and so indicating lower usage, than corresponding follower robot paths 320 and 322 shown in FIG. 3B that are utilized during a non-meal time of scenario 300. Also, follower robots can be redeployed to increase usage on other paths not likely to be taken by human actors during the meal time, such as increasing usage on follower robot path 368 shown in FIG. 3E in comparison to corresponding follower robot path 326 shown in FIG. 3B. As another example, connector robot CR5 operating in CR5 region 338b that includes dock 232a where food truck 360 is located, can avoid paths taken to dock 232a to reduce traffic to dock 232a and correspondingly increase usage to dock 232b, as indicated by comparing connector robot paths 338a taken by connector robot CR5 during non-meal times and connector robot paths 370 taken by connector robot CR5 during the meal time.

Figure 3F:

FIG. 3F shows human actor, follower robot, and connector robot paths during a shift change of scenario 300. In scenario 300, human actors start and stop work at designated shift change times; e.g., 7 AM, 3 PM, and 11 PM. As during the meal time, human actors have been asked to take paths around the periphery of environment 200 to go between exit 234 and working locations within environment 200, such as dispatch centers 212a, 212b, 212c, 212d and docks 232a, 232b, 232c, 232d. In scenario 300, exit 234 is located at the southeast corner of environment 200 and human actors have been specifically asked to follow the southernmost wide hallway (below the fourth row of storage locations) to go to and from exit 234, such as shown by human actor path 380 of FIG. 3F, in order to avoid interference with robotic actors working during shift changes.

During shift changes, robotic actors can change their behavior to both avoid paths likely taken by human actors going to and from exit 234. For example, follower robots can maintain high usage of follower robot path 382 of FIG. 3F, which corresponds to follower robot path 320 of FIG. 3B, as human actors are unlikely to use the hallway above the first row of storage locations. Follower robots can also reduce or eliminate usage of paths in areas used by human actors going to and from exit 234—FIG. 3F shows avoided follower robot path 384, which corresponds to follower robot path 322 of FIG. 3B, that is along human actor path 380. Also, follower robots can be redeployed to increase usage on other paths not likely to be taken by human actors during the meal time, such as increasing usage on follower robot path 386 shown in FIG. 3F in comparison to corresponding follower robot path 326 shown in FIG. 3B. As another example, connector robot CR5 operating in CR5 region 338b can use different paths than used during non-shift change times, as no human actors are part of a connector robot's designated actor group during a shift change. FIG. 3F shows connector robot paths 388 taken connector robot CR5 operating in CR5 region 338b during the shift change as being of higher usage within storage 220 in comparison connector robot paths 338a taken by connector robot CR5 during non-shift changes. Carrier robot paths 388 can be utilized by connector robot CR4 to connect more frequently with follower robots, which are part of a connector robot's designated actor group during a shift change.

Figure 4A:
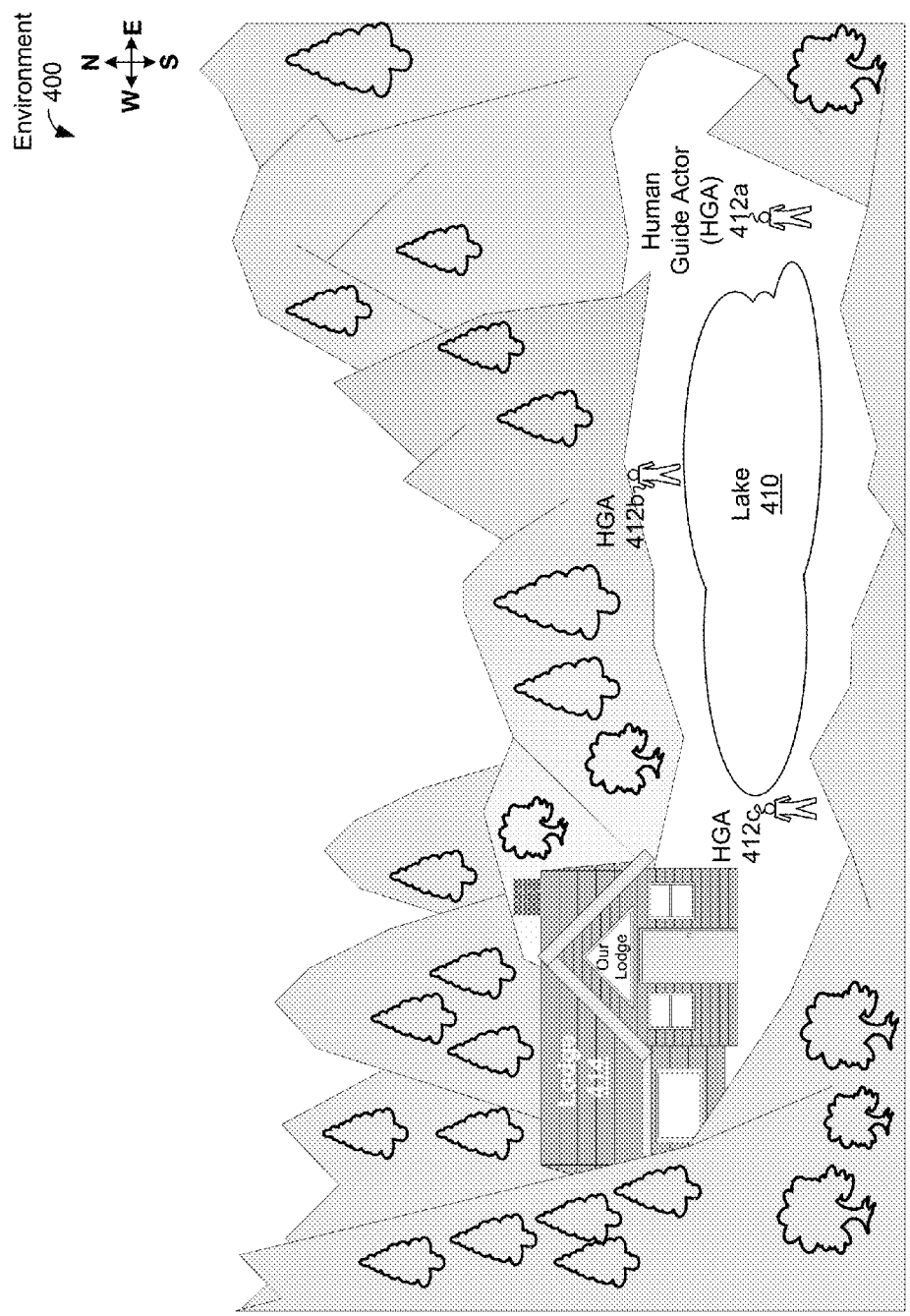
FIG. 4A depicts an outdoor environment, in accordance with an example embodiment.

FIG. 4A depicts outdoor environment 400, in accordance with an example embodiment. Environment 400 includes lake 410 and three human guide actors (HGA) 412a, 412b, and 412c that are used to guide sight seers to and from lodge 414 and around lake 410. At some times, lake 410 erupts as a geyser. Prior to an eruption, lake 410 typically bubbles and the air temperature near lake 410, as well as the water temperature of lake 410, typically rises. A robotic guide actor equipped with guide sensors, such as cameras, location sensors, thermometers, and perhaps other sensors, can determine whether conditions along a path are safe based on data obtained from the guide sensors. Similarly, a human guide actor can use his/her senses and perhaps guide sensors to observe environment 400, including lake 410, to determine whether a particular path near lake 410 is safe.

A robotic actor operating in environment 400 can carry out the role of a robotic guide actor by following instructions such as the example instructions shown below in Table 4. The example instructions can enable a robotic guide actor to generally follow paths of designated actors while having the ability to dynamically select a new path that maintains safety in changing environment 400.

TABLE 4

| | |
|---|---|
| 0001 | Designated_actor_group = {guide actors} |
| 0002 | Designated_region = {coordinates for region |
| 0003 | including lodge 414 and lake 410} |
| 0004 | Default movement instructions = { |
| 0005 | do |
| 0006 | current_location = get_current_location( ); |
| 0007 | safe = check_safety(current_location); |
| 0008 | if (safe) then // if safe, follow/move to DAG path |
| 0009 | if (on_designated_path(current_location)) then |
| 0010 | follow path of designated_actor_group |
| 0011 | within designated_region |
| 0012 | for one unit of time |
| 0013 | else |
| 0014 | move toward path of designated_actor_ group |
| 0015 | within designated_region |
| 0016 | for one unit of time |
| 0017 | end if // of if on path of designated group |
| 0018 | else |
| 0019 | // not safe so move in safe direction |
| 0020 | safe_direction = get_safe_direction(current_location); |
| 0021 | move in safe_direction for one unit of time; |
| 0022 | end if // else not safe so move in safe direction |
| 0023 | done = tour_complete(get_current_location( )) |
| 0024 | while (done == FALSE) |
| 0025 | end_of_tour( ); |
| 0026 | } |

Line 0001 of the example instructions in Table 4 specifies that a designated actor group for robotic guide actors includes the set of "guide actors". The default movement instructions for a robotic search actor are with respect to a designated region identified as a "region including lodge 414 and lake 410" on lines 0002 and 0003 of Table 4.

Lines 0004 to 0026 can provide example default movement instructions for robotic guide actors. The instructions include a loop shown on lines 0005 to 0024, which proceeds while a done variable is set to false. Lines 0006 and 0007 can indicate that the robotic guide actor is to store current location data in a current_location variable, and then call a check_safety function with the current_location as a parameter to determine if the current location is safe. The check_safety function can, for example, check weather conditions affecting environment 400, conditions of lake 410 and the surrounding landscape, and/or other information. For the example instructions, if the current location is safe, then the check_safety function will return a TRUE value; otherwise, check_safety will return a FALSE value. In some embodiments, the check_safety function can generate one or more annotations of a path when conditions change and/or become unsafe. On line 0007, the result of the check_safety function is stored in a safe variable.

Lines 0008 to 0022 include various conditional statements based initially on the value of the safe variable. If the value of the safe variable is TRUE, the statements on lines 0009 to 0017 are executed, which instruct the robotic guide actor to use an example on_designated_path function to determine if current_location is on a path taken by a designated actor. The on_designated_path function can return TRUE if the robotic guide actor is on a path taken by a designated actor, or return FALSE otherwise. In some embodiments, the on_designated_path function can determine if current_location is on the N (with N being an integer greater than 0) most recent path(s) taken by designated actor(s), is on or within the N most recent paths, and/or use other techniques to determine if current_location is on or perhaps near one or more paths taken by one or more designated actors. If the on_designated_path function returns TRUE, then the instructions on lines 0010 to 0012 of Table 4 are executed, which instruct the robotic guide actor to follow the path of the designated actor group within the designated region for one unit of time. Otherwise, as the on_designated_path function returns FALSE, then the instructions on lines 0013 to 0016 of Table 4 are executed, which instruct the robotic guide actor to move toward a nearest path of the designated actor group within the designated region for one unit of time. The unit of time can be a pre-determined amount of time; e.g., one second, 30 seconds, two minutes, etc., or can be otherwise determined; e.g., adjusted based on a rate of change of safety conditions (perhaps as a parameter modifiable by the check_safety function), such as weather conditions and/or conditions of lake 410, within environment 400.

If the value of the safe value is FALSE, then the example instructions of lines 0018 to 0022 can be executed by the robotic guide actor to get a safe direction to move at line 0020 and move in the safe direction for one unit of time at 0021. Determination of a safe direction by the example get_safe_direction function can be made based on the same or similar considerations use to determine safety of a location performed by the above-mentioned check_safety function.

After the robotic guide actor moves for a unit of time via execution of the conditional statements on lines 0008 to 0022 of Table 4, the robotic guide actor can then use a done variable to store a determination made whether a tour is completed using the example tour_complete function operating on the current location. The tour_complete function can return TRUE if the current location is at the end of the tour; e.g., a location near lodge 414, a location at the end of a path taken by a designated actor, or FALSE otherwise. Line 0024 of Table 4 can indicate that the loop will iterate again if the done variable is set to FALSE; otherwise, the loop will terminate. Line 0025 of Table 4 can have the robotic guide actor perform end of tour activities, such as stopping the robot, thanking participants for taking the tour and asking them to come again, etc. Similar instructions to those shown in Table 4 can be provided to humans guide actor. Many other techniques and instructions based on designated actor paths can be used to direct guide actors.

FIGS. 4B-4E show scenario 402 with robotic guide actors 416*a*, 416*b*, 416*c* generating path networks in environment 400 based on paths of designated actors, in accordance with an example embodiment. In scenario 402, each of robotic guide actors 416*a*, 416*b*, 416*c* operating on the instructions provided above in Table 4.

Figure 4B:
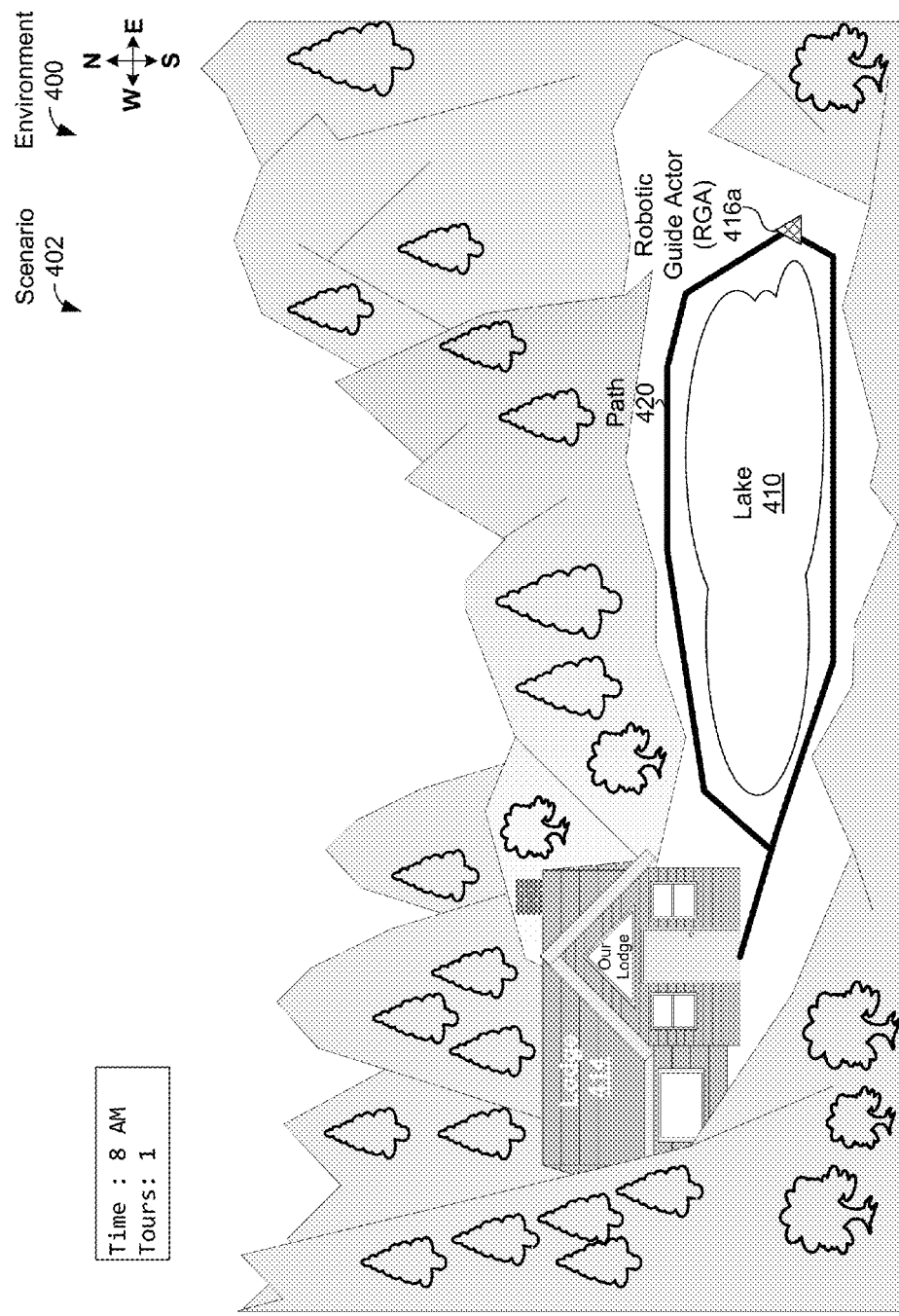
FIGS. 4B-4E show a scenario with actors generating path networks in the outdoor environment of FIG. 4A based on paths of designated actors, in accordance with an example embodiment.

FIG. 4B shows that scenario 402 begins at 8 AM where robotic guide actor (RGA) 416*a* is conducting a first tour of the day around lake 410. As indicated by path 420 of FIG. 4B, tours in scenario 402 start at lodge 414, make a loop around lake 410, and return to lodge 414. During this tour, the conditions are safe, and so robotic guide actor 416*a* follows path 420 for the tour, which was previously followed by guide actors to tour lake 410.

Figure 4C:
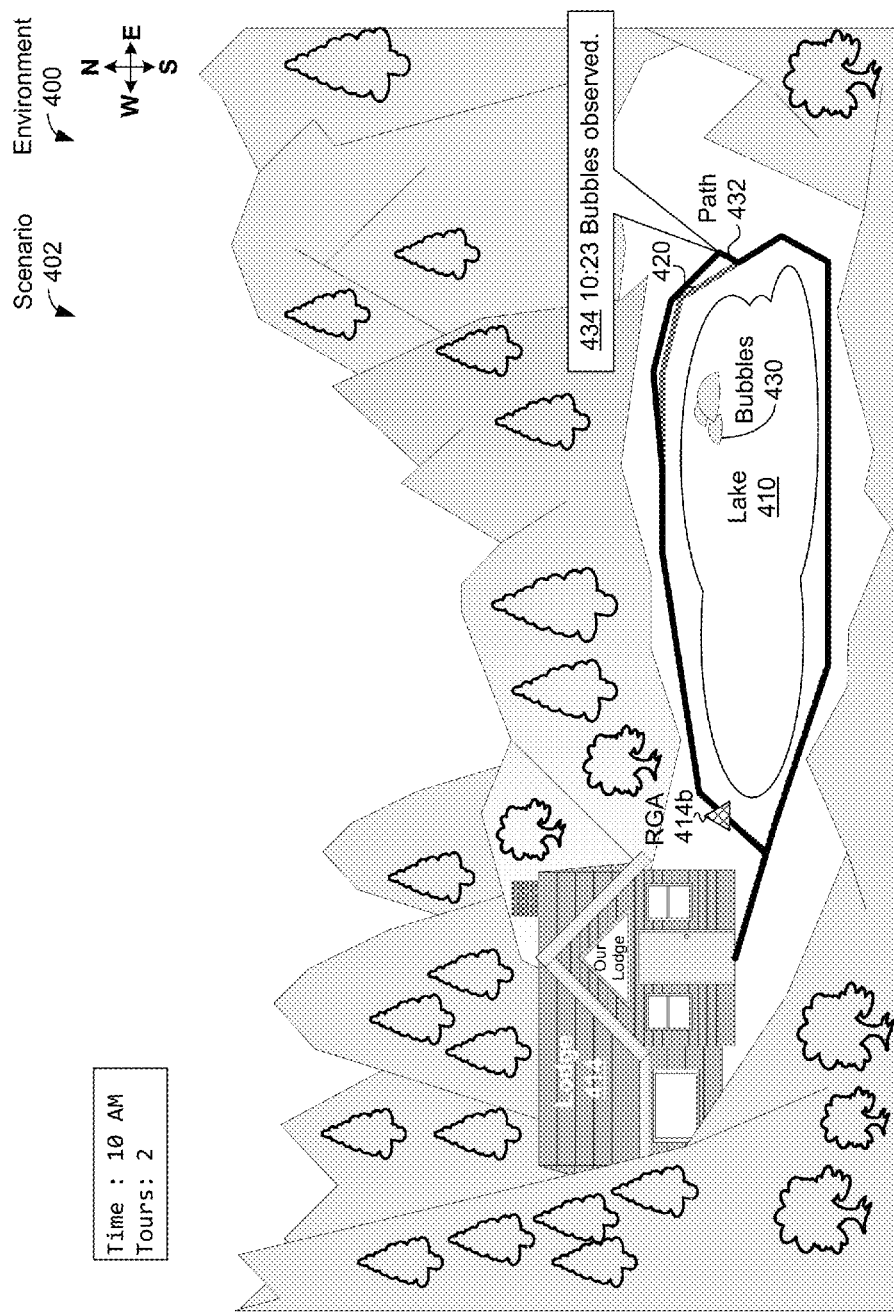

FIG. 4C shows scenario 402 continuing with a second tour of lake 410 being performed by robotic guide actor 416*b* starting at 10 AM. During the second tour, robotic guide actor 416*b* detected bubbles 430 in a north-eastern portion of lake 410. The size of bubbles 430 can indicate to robotic guide actor 416*b* that a geyser eruption in lake 410 will occur, but is unlikely to be imminent. For safety's sake, however, robotic guide actor 416*b* can deviate from previously followed path 420 (shown in grey in FIG. 4C) to take path 432 (shown in black in FIG. 4C) for the second tour to keep a little more distance from the north-eastern portion of lake 410 and then return to path 420, as instructed by the example instructions of Table 4.

At the location where bubbles 430 are detected, the example check_safety function or some other functionality associated with robotic guide actor 416*b* can annotate path 432. For example, FIG. 4C shows annotation 434 indicates that "bubbles observed" at "10:23" to record a time and reason for varying from path 420 and/or to indicate conditions present in environment 400. Other annotations and indications are possible as a result of observing bubbles in lake 410; e.g., an indication/warning that a geyser eruption for lake 410 is possible, a photo or video of the bubbles can be provided with the annotation, communication to interested parties (e.g., updating a Lake 410 Geyser Watchers web site, sending Lake 410 Geyser Watchers social-media communication(s), e-mails, text messages, etc.).

Figure 4D:
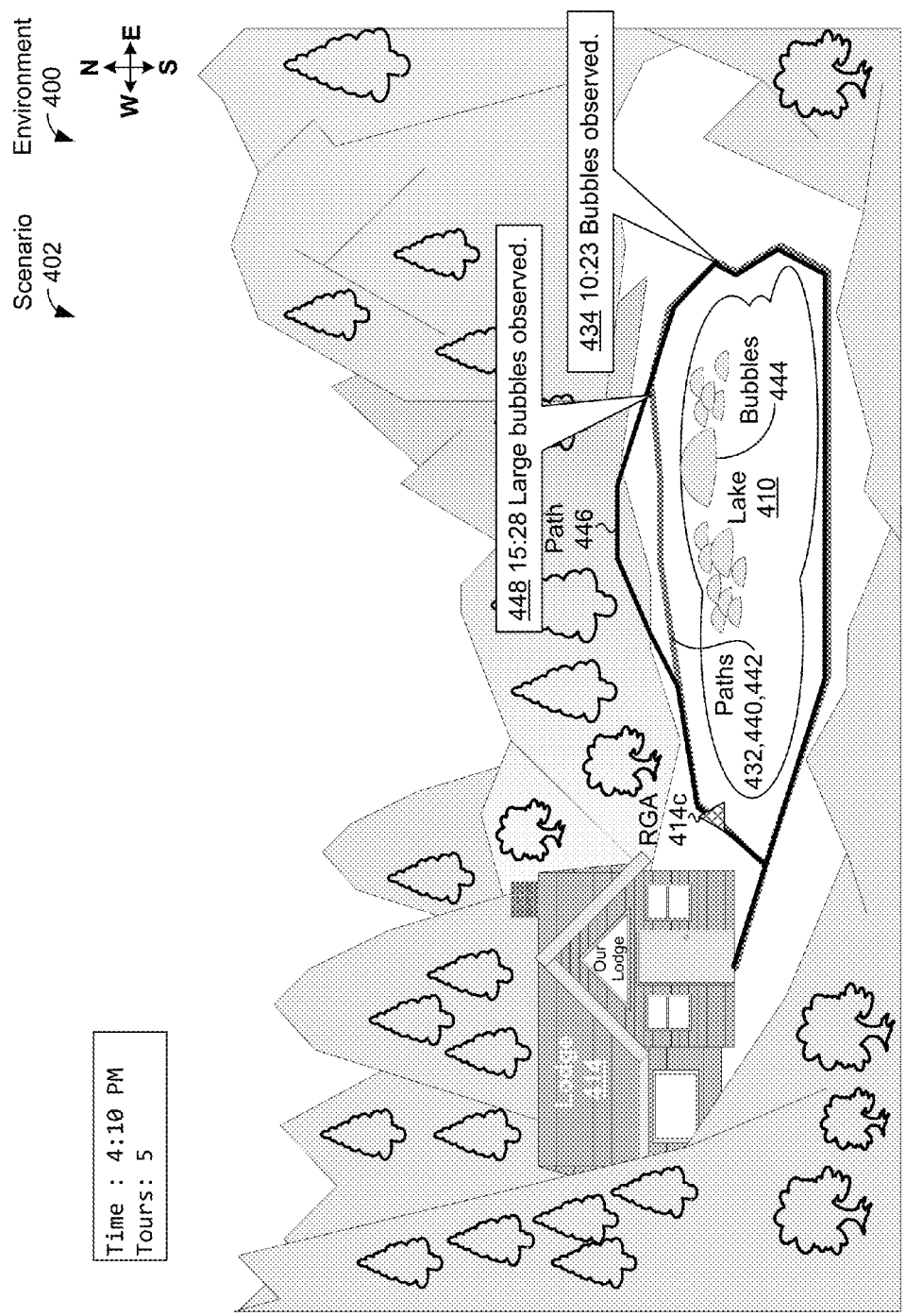

FIG. 4D depicts a fifth tour of lake 410 nearly being completed at 4:10 PM by robotic guide actor 416*c*. In scenario 402, third and fourth tours of lake 410 were completed taking respective paths 440 and 442 that followed path 432 (shown in FIG. 4C), and then robotic guide actor 416*c* continued with the fifth tour starting at approximately 3:00 PM.

During the fifth tour, robotic guide actor 416*c* detected large bubbles 444 in a north-eastern portion of lake 410 at 3:28 PM (15:28 military time). The size of bubbles 444 can indicate to robotic guide actor 416*c* that a geyser eruption in lake 410 will occur in about an hour, but may occur sooner. For safety's sake, robotic guide actor 416*c* can deviate from previously followed paths 432, 440, 442 (shown in grey in FIG. 4D) to take path 446 (shown in black in FIG. 4D) for the fifth tour maintain a safe distance from the northern portion of lake 410 that is bubbling and then return to paths 432, 440, 442, as instructed by the example instructions of Table 4.

Figure 4E:
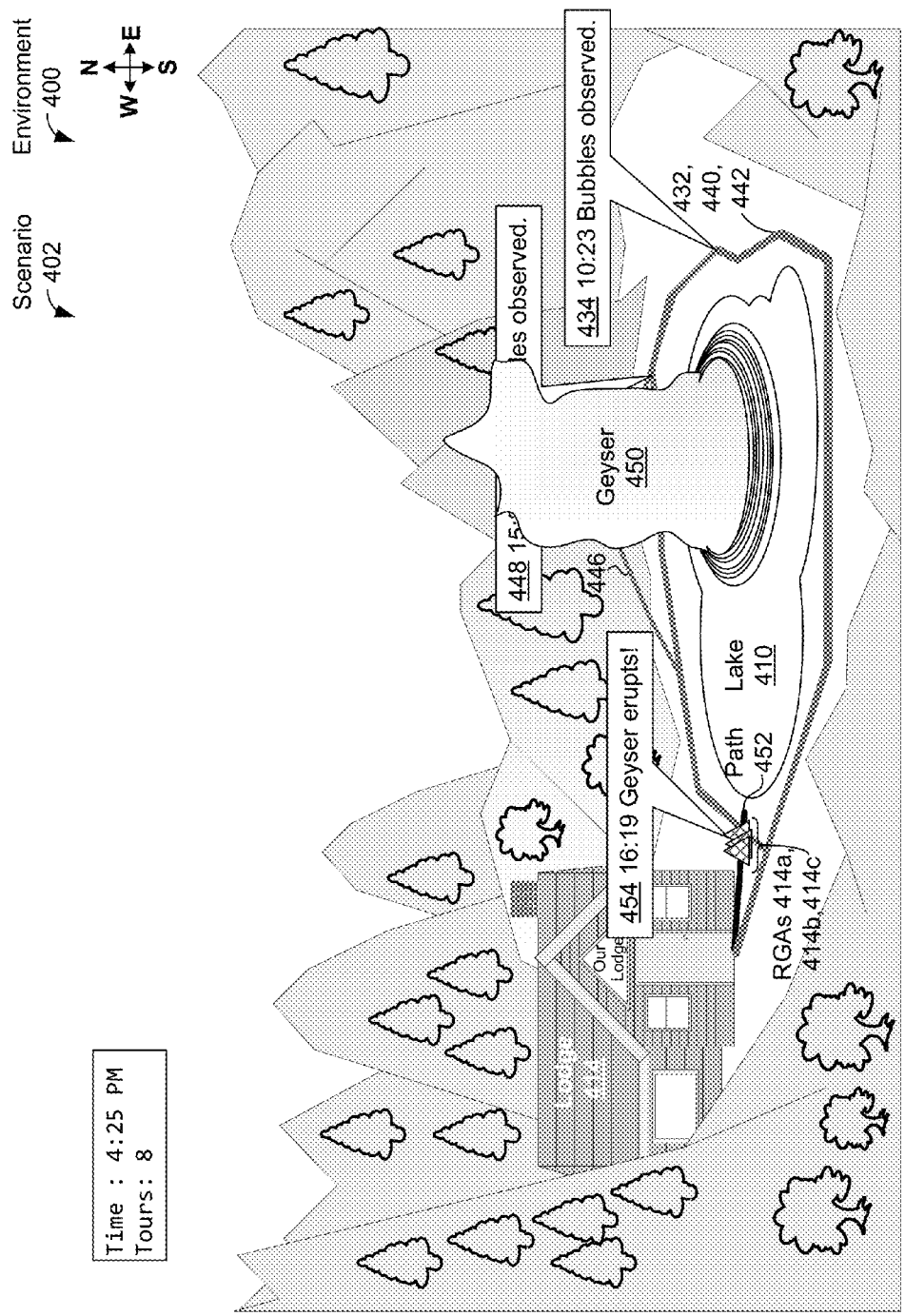

At the location where bubbles 444 are first detected, the example check_safety function or some other functionality associated with robotic guide actor 416*c* can annotate path 446. For example, FIG. 4D shows annotation 448 indicates that "Large bubbles observed" at "15:28" to record a time and reason for varying from paths 432, 440, 442 and/or to indicate conditions present in environment 400. Other annotations and indications are possible as well, such as discussed above in the context of FIG. 4C Scenario 402 continues with geyser 450 erupting from lake 410. FIG. 4E depicts sixth, seventh, and eighth tours of lake 410 in progress at 4:25 PM conducted respective guide actors 416*a*, 416*b*, 416*c*, all of which have taken path 452 for their respective tour. During the beginning of the sixth tour, robotic guide actor 416*a* detected geyser 450 erupting from lake 410 at 4:19 PM (16:19 military time).

When a geyser erupts in lake 410 during scenario 400, robotic guide actors are directed to follow one safe path to a northwestern edge of lake 410, which allows tour patrons to clearly view geyser 450 at a safe location. Safe path information can, for example, be provided to robotic actors as part of the check_safety and/or get_safe_direction functions discussed above in the context of Table 4. In other scenarios where a tour guided by a robotic guide actor is already going around lake 410, the robotic guide actor can be instructed to move to a location along path 452 or some other safe location while a geyser such as geyser 450 is erupting. As geyser eruptions are popular (perhaps due to the Lake 410 Geyser Watchers web site), additional tours often are conducted to allow more patrons to view geyser 450—in this case, the additional tours are the above-mentioned seventh and eighth tours.

At the location where geyser 450 is first detected, the example check_safety function or some other functionality associated with robotic guide actor 416*c* can annotate path 452. For example, FIG. 4E shows annotation 454 indicating that "Geyser erupts!" at "16:19" to record a time and reason for taking path 452 and/or to indicate conditions present in environment 400. Other annotations and indications are possible as well, such as discussed above in the context of FIG. 4C.

In scenario 402, geyser 450 erupts until about 4:30 PM and then subsides. Once geyser 450 subsides, robotic guide actors 416*a*, 416*b*, and 416*c* can either return to lodge 414 to conclude a "geyser only" tour, or continue to go around lake 410 to conduct a "geyser and lake experience" tour. Once the sixth, seventh, and eighth tours are completed, scenario 402 can be complete.

Computing Device Architecture

Figure 5A:
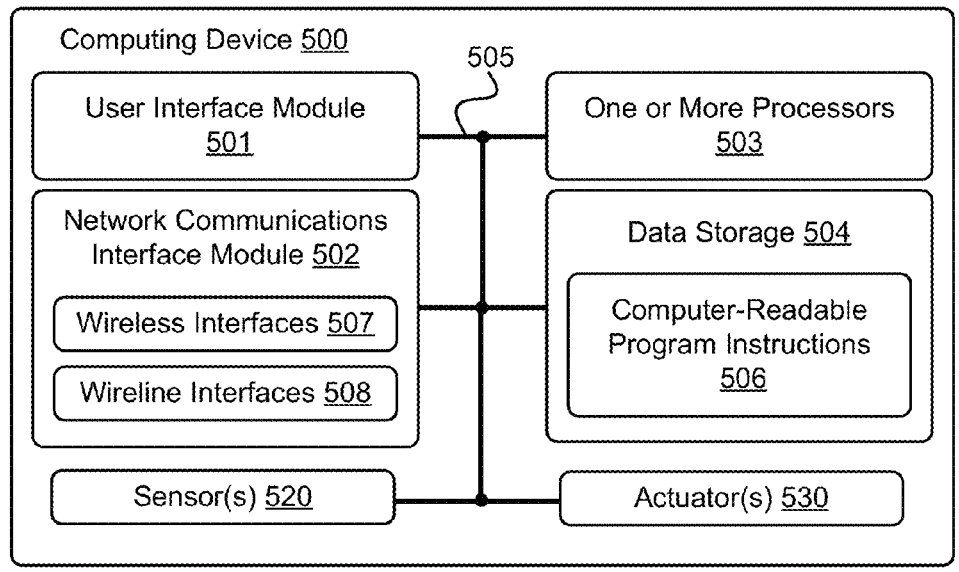
FIG. 5A is a functional block diagram of an example computing device, in accordance with an example embodiment.

FIG. 5A is a functional block diagram of an example computing device, in accordance with an example embodiment.

FIG. 5A is a block diagram of a computing device 500 (e.g., system) in accordance with an example embodiment. In particular, computing device 500 shown in FIG. 5A can be configured to perform one or more functions of a designated actor, a non-designated actor, a connector robot, a follower robot, a search actor, a guide actor, network 514, methods 280 and 600, and one or more functions related to one or more of scenarios 300 and 402. Computing device 500 may include a user interface module 501, a network-communication interface module 502, one or more processors 503, data storage 504, one or more sensors 520, and one or more actuators 530, all of which may be linked together via a system bus, network, or other connection mechanism 505.

User interface module 501 can be operable to send data to and/or receive data from external user input/output devices. For example, user interface module 501 can be configured to send and/or receive data to and/or from user input devices such as a keyboard, a keypad, a touch screen, a computer mouse, a track ball, a joystick, a camera, a voice recognition module, and/or other similar devices. User interface module 501 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 501 can also be configured to generate audible output(s), such as a speaker, speaker jack, audio output port, audio output device, earphones, and/or other similar devices.

Network-communications interface module 502 can include one or more wireless interfaces 507 and/or one or more wireline interfaces 508 that are configurable to communicate via a network. Wireless interfaces 507 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 508 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 502 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 503 can include one or more general purpose processors and/or one or more special purpose processors (e.g., digital signal processors, graphics processing units, application specific integrated circuits, etc.). Processors 503 can be configured to execute computer-readable program instructions 506 that are contained in the data storage 504 and/or other instructions as described herein.

Data storage 504 can include one or more computer-readable storage media that can be read and/or accessed by at least one of processors 503. The one or more computer-readable storage media can include volatile and/or non-volatile storage components, such as optical, magnetic, organic or other memory or disc storage, which can be integrated in whole or in part with at least one of processors 503. In some embodiments, data storage 504 can be implemented using a single physical device (e.g., one optical, magnetic, organic or other memory or disc storage unit), while in other embodiments, data storage 504 can be implemented using two or more physical devices.

Data storage 504 can include computer-readable program instructions 506 and perhaps additional data. In some embodiments, data storage 504 can additionally include storage required to perform at least part of the herein-described methods and techniques and/or at least part of the functionality of the devices and networks.

In some embodiments, computing device 500 can include one or more sensors 520. Sensor(s) 520 can be configured to measure conditions in an environment for computing device 500 and provide data about that environment. In some examples, sensor(s) 520 can include one or more of: a gyroscope, an accelerometer, a Doppler sensor, a sonar sensor, a radar device, a laser-displacement sensor, and a compass, possibly to measure locations and/or movements of the computing device 500. In other examples, sensor(s) 520 can include one or more of: an infrared sensor, an optical sensor, a light sensor, a camera, a biosensor, a capacitive sensor, a touch sensor, a temperature sensor, a wireless sensor, a radio sensor, a movement sensor, a microphone, a sound sensor, and/or a smoke sensor, possibly to obtain data indicative of an environment of the computing device 500. In addition, sensor(s) 520 can include one or more sensors that measure forces acting about the computing device 500. For example, sensor(s) 520 can include one or more sensors that measure forces (e.g., inertial forces and/or G-forces) in multiple dimensions. Further, sensor(s) 520 can include one or more sensors that measure: torque, ground force, friction, and/or a zero moment point (ZMP) sensor that identifies ZMPs and/or locations of the ZMPs. Other examples of sensor(s) 520 are possible as well.

Computing device 500 can include one or more actuators 530 that enable computing device 500 to initiate movement. For example, actuator(s) 530 can include or be incorporated with robotic joints connecting robotic limbs to a robotic body. For example, actuator(s) 530 can include respective robotic hip and robotic shoulder joints connecting respective robotic legs and arms to the robotic body. Further, the actuator(s) 530 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 530 can include respective robotic ankle joints connecting the robotic legs to robotic feet and respective robotic wrist joints connecting the robotic arms to robotic hands. In addition, actuator(s) 530 can include motors for moving the robotic limbs. As such, the actuator(s) 530 can enable mobility of computing device 500. Other examples of actuator(s) 530 are possible as well.

Cloud-Based Servers

Figure 5B:
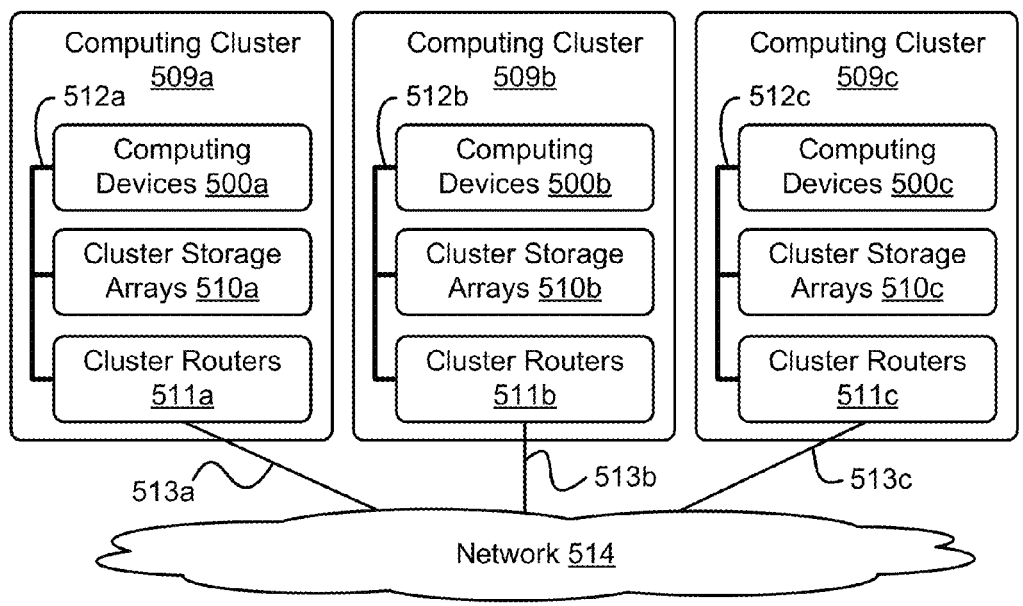
FIG. 5B depicts a cloud-based server system, in accordance with an example embodiment.

FIG. 5B depicts a network 514 of computing clusters 509*a*, 509*b*, 509*c* arranged as a cloud-based server system in accordance with an example embodiment. Computing clusters 509*a*, 509*b*, 509*c* can be cloud-based devices that store program logic and/or data of cloud-based applications and/or services; e.g., some or all of the herein-described functionality related to scenario 300, scenario 402, method 280, and/or method 600.

In some embodiments, computing clusters 509*a*, 509*b*, 509*c* can be a single computing device residing in a single computing center. In other embodiments, computing clusters 509*a*, 509*b*, 509*c* can include multiple computing devices in a single computing center, or even multiple computing devices located in multiple computing centers located in diverse geographic locations. For example, FIG. 5B depicts each of computing clusters 509*a*, 509*b*, 509*c* residing in different physical locations.

In some embodiments, data and services at computing clusters 509a, 509b, 509c can be encoded as computer readable information stored in non-transitory, tangible computer readable media (or computer readable storage media) and accessible by other computing devices. In some embodiments, computing clusters 509a, 509b, 509c can be stored on a single disk drive or other tangible storage media, or can be implemented on multiple disk drives or other tangible storage media located at one or more diverse geographic locations.

FIG. 5B depicts a cloud-based server system in accordance with an example embodiment. In FIG. 5B, functionality of a robot, robotic device, and/or robotic actor can be distributed among three computing clusters 509a, 509b, and 509c. Computing cluster 509a can include one or more computing devices 500a, cluster storage arrays 510a, and cluster routers 511a connected by a local cluster network 512a. Similarly, computing cluster 509b can include one or more computing devices 500b, cluster storage arrays 510b, and cluster routers 511b connected by a local cluster network 512b. Likewise, computing cluster 509c can include one or more computing devices 500c, cluster storage arrays 510c, and cluster routers 511c connected by a local cluster network 512c.

In some embodiments, each of the computing clusters 509a, 509b, and 509c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 509a, for example, computing devices 500a can be configured to perform various computing tasks of a robot, robotic device, and/or robotic actor. In one embodiment, the various functionalities of a robot, robotic device, and/or robotic actor can be distributed among one or more computing devices 500a, 500b, and 500c. Computing devices 500b and 500c in respective computing clusters 509b and 509c can be configured similarly to computing devices 500a in computing cluster 509a. On the other hand, in some embodiments, computing devices 500a, 500b, and 500c can be configured to perform different functions.

In some embodiments, computing tasks and stored data associated with a robot, robotic device, and/or robotic actor can be distributed across computing devices 500a, 500b, and 500c based at least in part on the processing requirements of a robot, robotic device, and/or robotic actor, the processing capabilities of computing devices 500a, 500b, and 500c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 510a, 510b, and 510c of the computing clusters 509a, 509b, and 509c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a robot, robotic device, and/or robotic actor can be distributed across computing devices 500a, 500b, and 500c of computing clusters 509a, 509b, and 509c, various active portions and/or backup portions of these components can be distributed across cluster storage arrays 510a, 510b, and 510c. For example, some cluster storage arrays can be configured to store one portion of the data of a robot, robotic device, and/or robotic actor, while other cluster storage arrays can store other portion(s) of data of a robot, robotic device, and/or robotic actor. Additionally, some cluster storage arrays can be configured to store backup versions of data stored in other cluster storage arrays.

The cluster routers 511a, 511b, and 511c in computing clusters 509a, 509b, and 509c can include networking equipment configured to provide internal and external communications for the computing clusters. For example, the cluster routers 511a in computing cluster 509a can include one or more internet switching and routing devices configured to provide (i) local area network communications between the computing devices 500a and the cluster storage arrays 510a via the local cluster network 512a, and (ii) wide area network communications between the computing cluster 509a and the computing clusters 509b and 509c via the wide area network connection 513a to network 514. Cluster routers 511b and 511c can include network equipment similar to the cluster routers 511a, and cluster routers 511b and 511c can perform similar networking functions for computing clusters 509b and 509b that cluster routers 511a perform for computing cluster 509a.

In some embodiments, the configuration of the cluster routers 511a, 511b, and 511c can be based at least in part on the data communication requirements of the computing devices and cluster storage arrays, the data communications capabilities of the network equipment in the cluster routers 511a, 511b, and 511c, the latency and throughput of local networks 512a, 512b, 512c, the latency, throughput, and cost of wide area network links 513a, 513b, and 513c, and/or other factors that can contribute to the cost, speed, fault-tolerance, resiliency, efficiency and/or other design goals of the moderation system architecture.

Example Methods of Operation

Figure 6:
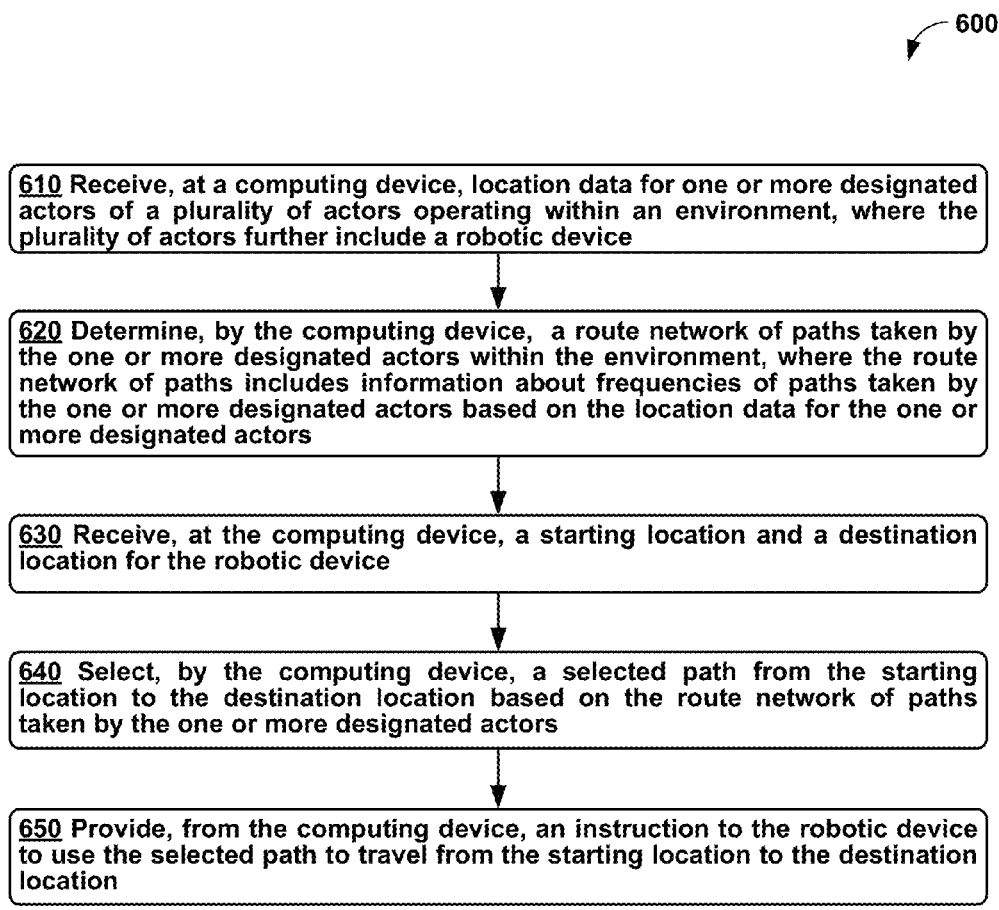
FIG. 6 is a flowchart of another method, in accordance with an example embodiment.

FIG. 6 is a flowchart of method 600, in accordance with an example embodiment. Method 600 can be executed on a computing device. Example computing devices include, but are not limited to, computing device 500 discussed with respect to FIG. 5A, a computing device aboard a herein-described robot, robotic actor, and/or robotic device, including but not limited to a computing device aboard a follower robot, a connector robot, a robotic search actor, and/or a robotic guide actor, a computing device inside or otherwise associated with a building and/or other environment, and/or other computing device(s).

Method 600 can begin at block 610, where the computing device can receive location data for one or more designated actors of a plurality of actors operating within an environment, such a location data obtained by/for actors in environment 100 discussed above in the context of FIGS. 1A-1C, by sensors 224a-224D in environment 200 and discussed above in the context of FIGS. 2A and 3B-3E, location data of FIG. 2B, location data from robotic guide actors 416a, 416b, 416c in environment 400 discussed above in the context of FIGS. 4A-4E, location data from location sensors utilized by herein-described robots, robotic devices, and robotic actors, location data provided by and/or for herein-described human actors with their consent, and/or other location data for designated actors. The plurality of actors also can include a robotic device, such as described in the context of FIGS. 2A and 3B-4E. The location data can include data about a plurality of paths between the starting location and the destination location, as the environment can include the plurality of paths between the starting location and the destination location, such as shown in at least FIGS. 3A-3F and 4B-4E.

In some embodiments, the environment can include a building, such as a warehouse. Then, the computing device can be configured to be permanently located within the building. The computing device can be, but is not limited to being, a desktop computing device within the building, a mobile computing device designated to permanently remain in the building, a rack-mounted computing device, and/or a part or all network of computing devices configured to be permanently located within the building. In other embodiments, the computing device is configured to be a component of the robotic device. In still other embodiments, the computing device is configured to be at least part of a mobile device associated with an actor of the plurality of actors, such as a mobile device carried by a human or robotic actor, a mobile device affixed to a robotic actor, or some other mobile computing device associated with an actor of the plurality of actors.

At block 620, the computing device can determine a route network of paths taken by the one or more designated actors within the environment. The route network of paths can be based on the location data for the one or more designated actors, such as discussed above at least in the context of FIG. 2B and as paths in environments 200 and 400 and shown at least FIGS. 3A-3F and 4B-4E.

At block 630, the computing device can receive a starting location and a destination location for the robotic device.

At block 640, the computing device can select a path from the starting location to the destination location based on the route network of paths taken by the one or more designated actors, such as discussed above at least in the context of the instructions of Tables 1-4 for respective herein-described follower robots, connector robots, robotic search actors, and robotic guide actors also discussed above in the context of at least FIGS. 1A-1C and 2B-4E.

In some embodiments, selecting the selected path from the starting location to the destination location based on the route network of paths can include selecting at least a portion of the selected path that follows at least one path in the route network of paths, such as discussed above in the context of at least Tables 1 and 4, and at least FIGS. 1A-1C, 3B, 3E, 3F and 4A-4E. In particular of these embodiments, selecting the at least the portion of the selected path that follows at least one path can include selecting the at least the portion of the selected path that follows the at least one path based on a role of the robotic device, such as discussed above in the context of at least Tables 1 and 4, and at least FIGS. 3B, 3E, 3F and 4A-4E. In other particular of these embodiments, selecting the at least the portion of the selected path that follows at least one path can include selecting the at least the portion of the selected path that follows the at least one path based on a time of day, such as discussed above in the context of at least Tables 1 and 4, and at least FIGS. 3B, 3E, 3F and 4A-4E. In still other particular of these embodiments, selecting the at least the portion of the selected path that follows at least one path can include selecting the at least the portion of the selected path that follows the at least one path based on a type of a designated actor, where the type of the designated actor is selected from a robotic-actor type, a human-actor type, and a human-controlled-actor type, such as discussed above in the context of at least Tables 1 and 4, and at least FIGS. 1A-1C, 3B, and 4A-4E.

In some other embodiments, selecting the path from the starting location to the destination location based on the route network of paths can include selecting at least a portion of the selected path that avoids at least one path in the route network of paths, such as discussed above in the context of at least Table 3 and at least FIGS. 3D-3F. In particular of these embodiments, selecting the at least the portion of the selected path that avoids at least one path can include selecting the at least the portion of the selected path that avoids the at least one path based on a role of the robotic device, such as discussed above in the context of at least Table 3 and at least FIGS. 3D-3F. In other particular of these embodiments, selecting the at least the portion of the selected path that avoids the at least one path can include selecting the at least the portion of the selected path that avoids the at least one path based on a time of day, such as discussed above in the context of at least FIGS. 3D and 3E. In still other particular of these embodiments, selecting at least a portion of the selected path that avoids the at least one path can include selecting the at least the portion of the selected path that avoids the at least one path based on a type of a designated actor, where the type of the designated actor is selected from a robotic-actor type, a human-actor type, and a human-controlled-actor type, such as discussed above in the context of at least Table 3 and at least FIGS. 3D-3F.

At block 650, the computing device can provide an instruction to the robotic device to use the selected path to travel from the starting location to the destination location, such as discussed above at least in the context of the instructions of Tables 1-4 for respective herein-described follower robots, connector robots, robotic search actors, and robotic guide actors also discussed above in the context of at least FIGS. 2B-4E.

In some embodiments, method 600 can also include: receiving additional location data for the one or more designated actors while they continue to operate within the environment and updating the route network of paths based on the additional location data, such as discussed above in the context of at least FIGS. 1A-1C, 2B, and 4A-4E.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
   receiving, at a computing device, location data for one or more designated actors of a plurality of actors operating within an environment, wherein the plurality of actors further comprise a robotic device;
   determining, by the computing device, a route network of paths taken by the one or more designated actors within the environment, wherein the route network of paths comprises information about frequencies of paths taken by the one or more designated actors based on the location data for the one or more designated actors;
   receiving, at the computing device, a starting location and a destination location for the robotic device;
   selecting, by the computing device, a selected path from the starting location to the destination location based on the route network of paths taken by the one or more designated actors; and
   providing, from the computing device, an instruction to the robotic device to use the selected path to travel from the starting location to the destination location.

2. The method of claim 1, wherein selecting the selected path from the starting location to the destination location based on the route network of paths taken by the one or more designated actors comprises selecting at least a portion of the selected path that follows at least one path in the route network of paths.

3. The method of claim 2, wherein selecting the at least the portion of the selected path that follows at least one path comprises selecting the at least the portion of the selected path that follows the at least one path based on a role of the robotic device.

4. The method of claim 2, wherein selecting the at least the portion of the selected path that follows at least one path comprises selecting the at least the portion of the selected path that follows the at least one path based on a time of day.

5. The method of claim 2, wherein selecting the at least the portion of the selected path that follows at least one path comprises selecting the at least the portion of the selected path that follows the at least one path based on a type of a designated actor, wherein the type of the designated actor is selected from a robotic-actor type, a human-actor type, and a human-controlled-actor type.

6. The method of claim 1, wherein selecting the path from the starting location to the destination location based on the route network of paths taken by the one or more designated actors comprises selecting at least a portion of the selected path that avoids at least one path in the route network of paths.

7. The method of claim 6, selecting the at least the portion of the selected path that avoids at least one path comprises selecting the at least the portion of the selected path that avoids the at least one path based on a role of the robotic device.

8. The method of claim 6, selecting the at least the portion of the selected path that avoids the at least one path comprises selecting the at least the portion of the selected path that avoids the at least one path based on a time of day.

9. The method of claim 6, selecting at least a portion of the selected path that avoids the at least one path comprises selecting the at least the portion of the selected path that avoids the at least one path based on a type of a designated actor, wherein the type of the designated actor is selected from a robotic-actor type, a human-actor type, and a human-controlled-actor type.

10. The method of claim 1, further comprising:
   receiving additional location data for the one or more designated actors while they continue to operate within the environment; and
   updating the route network of paths based on the additional location data.

11. A computing device, comprising:
   one or more processors; and
   data storage including at least computer-executable instructions stored thereon that, when executed by the one or more processors, cause the computing device to perform functions comprising:
  receiving location data for one or more designated actors of a plurality of actors operating within an environment, wherein the plurality of actors further comprise a robotic device;
  determining a route network of paths taken by the one or more designated actors within the environment based on the location data for the one or more designated actors, wherein the route network of paths comprises information about frequencies of paths taken by the one or more designated actors based on the location data for the one or more designated actors;
  receiving a starting location and a destination location for the robotic device;
  selecting a selected path from the starting location to the destination location based on the route network of paths taken by the one or more designated actors; and
  providing an instruction to the robotic device to use the selected path to travel from the starting location to the destination location.

12. The computing device of claim 11, wherein selecting the selected path from the starting location to the destination location based on the route network of paths taken by the one or more designated actors comprises selecting at least a portion of the selected path that follows at least one path in the route network of paths.

13. The computing device of claim 12, wherein selecting the at least the portion of the selected path that follows at least one path comprises selecting the at least the portion of the selected path that follows the at least one path based on a role of the robotic device.

14. The computing device of claim 12, wherein selecting the at least the portion of the selected path that follows at least one path comprises selecting the at least the portion of the selected path that follows the at least one path based on a time of day.

15. The computing device of claim 12, wherein selecting the at least the portion of the selected path that follows at least one path comprises selecting the at least the portion of the selected path that follows the at least one path based on a type of a designated actor, wherein the type of the designated actor is selected from a robotic-actor type, a human-actor type, and a human-controlled-actor type.

16. The computing device of claim 11, wherein selecting the path from the starting location to the destination location based on the route network of paths taken by the one or more designated actors comprises selecting at least a portion of the selected path that avoids at least one path in the route network of paths.

17. The computing device of claim 11, wherein the environment comprises a warehouse, and wherein the computing device is configured to be permanently located within the warehouse.

18. The computing device of claim 11, wherein the computing device is configured to be a component of the robotic device.

19. The computing device of claim 11, wherein the computing device is configured to be at least part of a mobile device associated with an actor of the plurality of actors.

20. A non-transitory computer readable medium having stored thereon instructions, that when executed by one or more processors of a computing device, cause the computing device to perform functions comprising:
  receiving location data for one or more designated actors of a plurality of actors operating within an environment, wherein the plurality of actors further comprise a robotic device;
  determining a route network of paths taken by the one or more designated actors within the environment, wherein the route network of paths comprises information about frequencies of paths taken by the one or more designated actors based on the location data for the one or more designated actors;
  receiving a starting location and a destination location for the robotic device;
  selecting a selected path from the starting location to the destination location based on the route network of paths taken by the one or more designated actors; and
  providing an instruction to the robotic device to use the selected path to travel from the starting location to the destination location.

* * * * *